US012654424B2

(12) United States Patent
Taxak et al.

(10) Patent No.: US 12,654,424 B2
(45) Date of Patent: Jun. 16, 2026

(54) MULTI-LAYERED THERMAL INSULATION SYSTEM FOR BATTERY THERMAL RUNAWAY MANAGEMENT

(71) Applicant: Zephyros, Inc., Romeo, MI (US)

(72) Inventors: Manish Taxak, Maharashtra (IN);
Peter Cate, Gloucestershire (GB);
Sang-Kyoung Park, Gyeonggi-do (KR)

(73) Assignee: Zephyros, Inc., Romeo, MI (US)

( * ) Notice: Subject to any disclaimer, the term of this patent is extended or adjusted under 35 U.S.C. 154(b) by 244 days.

(21) Appl. No.: 18/282,811

(22) PCT Filed: Mar. 25, 2022

(86) PCT No.: PCT/US2022/021909
§ 371 (c)(1),
(2) Date: Sep. 19, 2023

(87) PCT Pub. No.: WO2022/204492
PCT Pub. Date: Sep. 29, 2022

(65) Prior Publication Data
US 2024/0190109 A1 Jun. 13, 2024

(30) Foreign Application Priority Data

Mar. 26, 2021 (IN) .............................. 202131013549
Dec. 3, 2021 (IN) .............................. 202131056235

(51) Int. Cl.
*B32B 15/14* (2006.01)
*B32B 3/30* (2006.01)
(Continued)

(52) U.S. Cl.
CPC ................ *B32B 15/14* (2013.01); *B32B 3/30*
(2013.01); *B32B 5/022* (2013.01); *B32B 5/073*
(2021.05);
(Continued)

(58) Field of Classification Search
CPC ......... B32B 15/14; B32B 5/266; B32B 5/073;
B32B 3/30; B32B 5/022; B32B 5/08;
(Continued)

(56) References Cited

U.S. PATENT DOCUMENTS

2003/0162019 A1* 8/2003 Zoitos ................. C04B 35/6224
428/364
2006/0010798 A1* 1/2006 Shaw ...................... E04B 1/948
52/232
(Continued)

FOREIGN PATENT DOCUMENTS

CN 111032940 A 4/2020
WO 2018/156691 A1 8/2018
(Continued)

OTHER PUBLICATIONS

BGF Industries "Engineered Nonwovens" (Year: 2004).*
(Continued)

*Primary Examiner* — Alicia J Weydemeyer
*Assistant Examiner* — Laura B Figg
(74) *Attorney, Agent, or Firm* — The Dobrusin Law Firm, P.C.

(57) ABSTRACT

An article comprising a plurality of layers, the layers comprising: one or more nonwoven layers; wherein each of the one or more nonwoven layers has a temperature resistance of about 200° C. or greater; and wherein the article is adapted to provide thermal insulation for a battery and avoid and/or contain fire propagation during a battery thermal runaway event.

20 Claims, 9 Drawing Sheets

(51) Int. Cl.

| | |
|---|---|
| *B32B 5/02* | (2006.01) |
| *B32B 5/06* | (2006.01) |
| *B32B 5/08* | (2006.01) |
| *B32B 5/26* | (2006.01) |
| *B32B 9/00* | (2006.01) |
| *B32B 9/04* | (2006.01) |
| *B32B 15/18* | (2006.01) |
| *H01M 10/625* | (2014.01) |
| *H01M 10/658* | (2014.01) |

(52) U.S. Cl.
CPC ................ *B32B 5/08* (2013.01); *B32B 5/266* (2021.05); *B32B 9/005* (2013.01); *B32B 9/047* (2013.01); *B32B 15/18* (2013.01); *H01M 10/625* (2015.04); *H01M 10/658* (2015.04); *B32B 2255/02* (2013.01); *B32B 2255/20* (2013.01); *B32B 2262/0246* (2013.01); *B32B 2262/08* (2013.01); *B32B 2262/101* (2013.01); *B32B 2262/144* (2021.05); *B32B 2307/304* (2013.01); *B32B 2307/3065* (2013.01); *B32B 2307/4026* (2013.01); *B32B 2307/7376* (2023.05); *B32B 2457/10* (2013.01); *H01M 2200/10* (2013.01); *H01M 2220/20* (2013.01)

(58) Field of Classification Search
CPC ......... B32B 9/005; B32B 9/047; B32B 15/18; B32B 2262/144; B32B 2307/7376; B32B 2255/02; B32B 2255/20; B32B 2262/0246; B32B 2262/08; B32B 2262/101; B32B 2307/304; B32B 2307/3065; B32B 2307/4026; B32B 2457/10; H01M 10/625; H01M 10/658; H01M 2200/10; H01M 2220/20
See application file for complete search history.

(56) References Cited

U.S. PATENT DOCUMENTS

| | | | | |
|---|---|---|---|---|
| 2008/0121461 | A1* | 5/2008 | Gross ...................... | D06M 11/82 442/334 |
| 2010/0203395 | A1* | 8/2010 | Toniazzo .............. | H01M 50/44 442/164 |
| 2019/0211500 | A1* | 7/2019 | Gacek ...................... | D04H 3/12 |
| 2021/0376405 | A1* | 12/2021 | Browning .............. | B32B 15/20 |

FOREIGN PATENT DOCUMENTS

| | | |
|---|---|---|
| WO | 2020/047846 A1 | 3/2020 |
| WO | 2020/083331 A1 | 4/2020 |
| WO | 2021/019495 A1 | 2/2021 |
| WO | 2021/022130 A1 | 2/2021 |

OTHER PUBLICATIONS

Product Data Sheet for Treo 2000 Needled Blanket (Year: 2020).*
International Search Report and Written Opinion dated Jun. 22, 2022, for International Application PCT/US2022/021909.
Chinese First Office Action, dated Jul. 29, 2025, for Chinese Application 202280025042.3.
Chinese Search Report, dated Jul. 28, 2025, for Chinese Application 202280025042.3.

\* cited by examiner

10

14

12

40

10

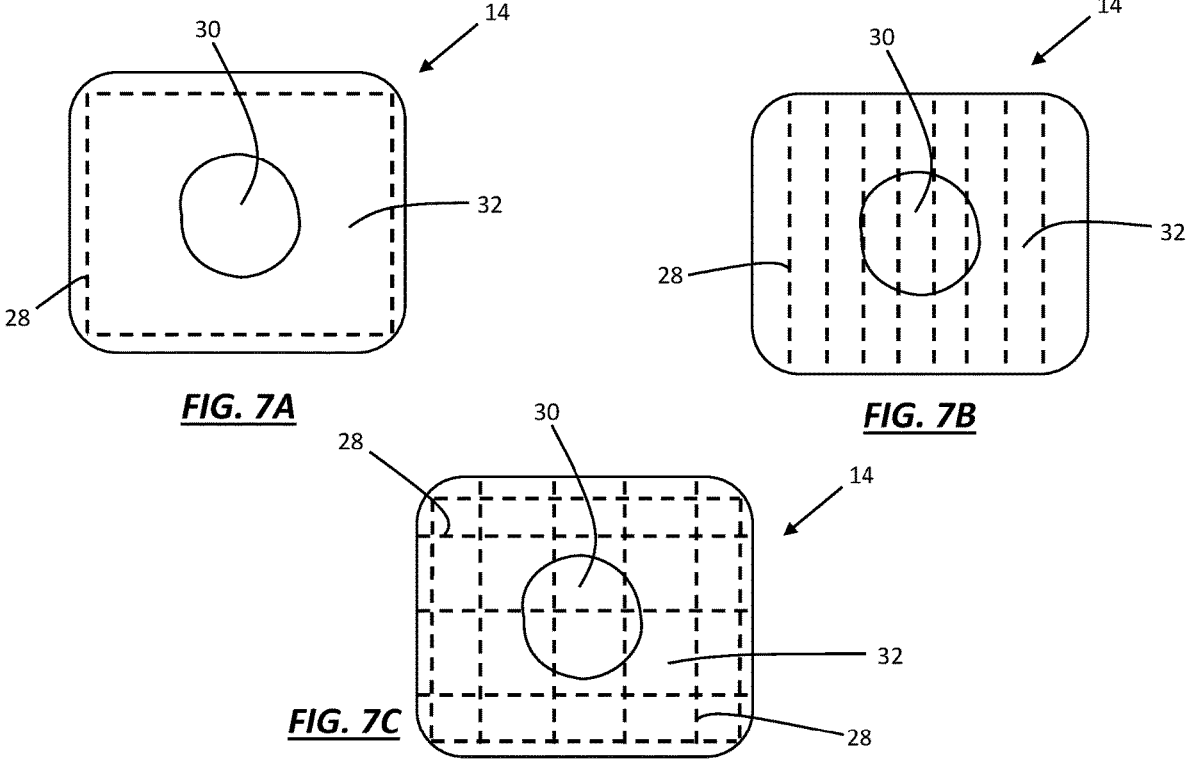
FIG. 7A
FIG. 7B
FIG. 7C
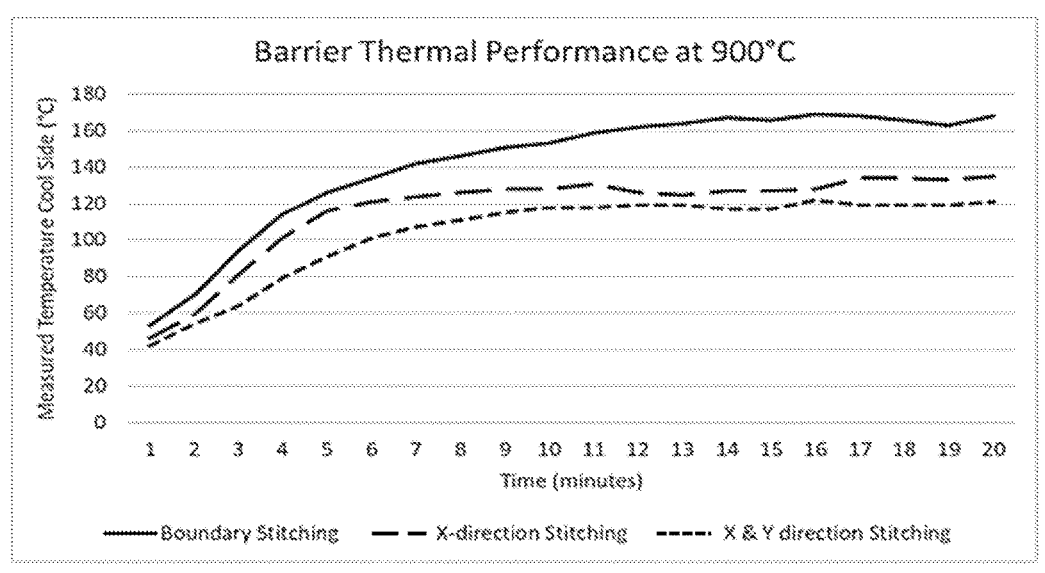
FIG. 7D

MULTI-LAYERED THERMAL INSULATION SYSTEM FOR BATTERY THERMAL RUNAWAY MANAGEMENT

FIELD

The present teachings generally relate to a multi-layered material for providing insulation, and more particularly, to an insulation material for providing insulation and fire containment for a battery.

BACKGROUND OF THE INVENTION

As the world is becoming more environmentally conscious, electric vehicles are gaining much attention. Countries around the world are investing in electric mobility-based initiatives, promoting manufacturing and use of electric and hybrid vehicles. Electric vehicles are powered, at least in part, by batteries. These batteries are rechargeable and are designed to power a vehicle over long periods of time, distances, or both. Mass transportation vehicles, such as cars, vans, trucks, trains, and buses, also are increasingly including electric options.

These batteries, however, experience significant temperature fluctuations. The life of a battery degrades over time as a function of the magnitude and frequency of these temperature fluctuations. Standalone battery systems may, for example, experience a fluctuation (e.g., an increase) in temperature of about 50° C. or greater due to different vehicle and environmental conditions, which can result in early discharge of the battery. In attempts to keep the temperatures of these batteries regulated, the vehicles include active temperature control systems. However, these active temperature control systems use energy, and if this energy usage is high, such as in adverse environmental conditions, this greatly reduces the range of the vehicle. Batteries being considered and designed for future use are operated at even higher temperatures than current battery packs, and these batteries need to be kept at particular temperatures.

Additionally, a main point of concern for these types of batteries is thermal runaway management. Thermal runaway of a battery may often occur when an internal heat generation within the battery exceeds the rate at which the heat can be expelled from the battery. Similarly, thermal runaway may also occur when a battery cell's integrity is compromised, such as by an accidental piercing of the battery cell, thereby resulting in the battery cell reaching more extreme temperatures for a duration of time. If such a condition occurs for an extended period of time, the battery may degrade to a point of causing an electrical fire and/or a battery explosion. Similarly, when a single battery cell is faulty or has a loss of integrity, the extreme heat expelled by the battery cell may reach surrounding battery cells within the system, thereby burning not only the compromised battery cell, but also some or all of the surrounding battery cells. Thus, it is critical for electrical vehicles to provide sufficient time for an occupant of the vehicle to reach a safe distance from the vehicle during a thermal runaway situation.

Thus, it is desirable to provide a battery insulation system that reduces temperature fluctuations, maintains battery temperature (e.g., within about 25° C.), improves battery live cycle, or a combination thereof. It is also desired to insulate a battery to reduce the amplitude, and thus the impact, of temperature fluctuations, thereby enhancing the longevity of the battery to be insulated. Moreover, it is desired to provide a battery insulation that prevents heat and/or chemical dissipation from the battery into the environment. Furthermore, it is desirable to provide a fire containment system during thermal runaway situations to ensure the safety of those near the battery.

SUMMARY

The present teachings meet one or more of the present needs by providing an article comprising a plurality of layers, the layers comprising: one or more nonwoven layers; wherein each of the one or more nonwoven layers has a temperature resistance of about 200° C. or greater; and wherein the article is adapted to provide thermal insulation for a battery and avoid and/or confine fire propagation during a battery thermal runaway event.

The battery may be an electric vehicle battery. The article may further include a metallic layer that may be a stainless-steel foil, and aluminum foil, or both. The one or more nonwoven layers may comprise inorganic fibers. The inorganic fibers may be present in the layer in an amount of about 50 wt % or greater, about 75 wt % or greater, or about 97 wt % or greater.

The article may have a thickness of greater than about 1 mm. The article may have a thickness of less than about 15 mm. At least one of the one or more nonwoven layers may have a temperature resistance of about 1,000° C. or greater. At least one of the one or more nonwoven layers may be treated with an intumescent solution. One or more of the nonwoven layers may comprise polyacrylonitrile fibers, oxidized polyacrylonitrile fibers, or both.

The article may comprise six or fewer layers. The one or more layers of the article may be the same as a layer directly adjacent, different than a layer directly adjacent, or both. The layers may include any of the following in any combination: a metallic layer, a metallized layer, a layer formed of oxidized polyacrylonitrile fibers, a needlepunched layer, a cross-lapped layer, a layer formed of inorganic fibers, an E-glass layer, an E-CR glass layer, a high silica nonwoven layer, a ceramic blanket, a black glass cloth layer, a vertically lapped layer, a horizontally lapped layer, a thermobond layer, or a combination thereof.

The present teachings may provide an article comprising: (a) one or more stainless-steel metallic foil facing layers; (b) one or more nonwoven layers including oxidized polyacrylonitrile fibers; (c) one or more high silica layers; (d) one or more wool-based paper and/or blanket layers; and (e) one or more additional nonwoven layers free of oxidized polyacrylonitrile fibers.

The one or more nonwoven layers may be needlepunched, crosslapped, thermobonded, or a combination thereof. The article may include one or more E-glass layers, one or more E-CR glass layers, one or more black glass cloth layers, one or more high silica fabric or cloth layers, or a combination thereof. Additionally, each of the nonwoven layers may have a temperature resistance of about 450° C. or greater, about 700° C. or greater, or about 1000° C. or greater. Moreover, the article may be a fire and heat barrier of the battery. Furthermore, one or more outer layers, one or more inner layers, or both of the article may be treated with an intumescent solution that expands on exposure to heat.

The article may extend generally coplanar with a surface of the battery. The article may be adapted to be located under a top and/or bottom cover of a battery housing that houses the battery. The article may be used in conjunction with an active temperature control system within a vehicle to maintain a proper battery temperature (e.g., within about 50° C., about 35° C., or about 25° C.). The article may be a passive thermal insulation product that is adapted for heat management between modules or cells within a battery or battery system.

The article may be adapted to comply with Global Technical Requirement (GTR20) and the Chinese technical standard GBMT38031, whereby the article provides a minimum time period of 5 minutes between a detection of the battery thermal runaway event and an actual impact of the battery thermal runaway event within a passenger compartment of the vehicle. The article may provide a minimum time period of 15 minutes between a detection of the battery thermal runaway event and an actual impact of the battery thermal runaway event within a passenger compartment of the vehicle. Similarly, the article may be adapted to maintain a temperature of less than 200° C. on a surface layer of the article that opposes the facing layer for at least 5 minutes when the face laying is exposed to a temperature of 500 to 1,200° C.

The present teachings meet one or more of the present needs by providing: a battery insulation system that reduces temperature fluctuations, maintains battery temperature (e.g., within about 25° C.), improves battery live cycle, or a combination thereof; a battery insulation system that reduces the amplitude, and thus the impact, of temperature fluctuations, thereby enhancing the longevity of the battery to be insulated; a battery insulation system that prevents heat and/or chemical dissipation from the battery into the environment; a fire containment system during thermal runaway situations to ensure the safety of those near the battery; or a combination thereof.

BRIEF DESCRIPTION OF THE DRAWINGS

FIG. 7A is a top-down view of a multi-layered insulator material having a perimeter stitch.

FIG. 7B is a top-down view of a multi-layered insulator material having a vertical stitch pattern.

FIG. 7C is a top-down view of a multi-layered insulator material having a vertical and horizontal stitch pattern.

FIG. 7D is a graph illustrating exemplary multi-layered insulator material barrier thermal performance during exposure to a heightened temperature based upon stitching variations.

DETAILED DESCRIPTION

Figure 1:
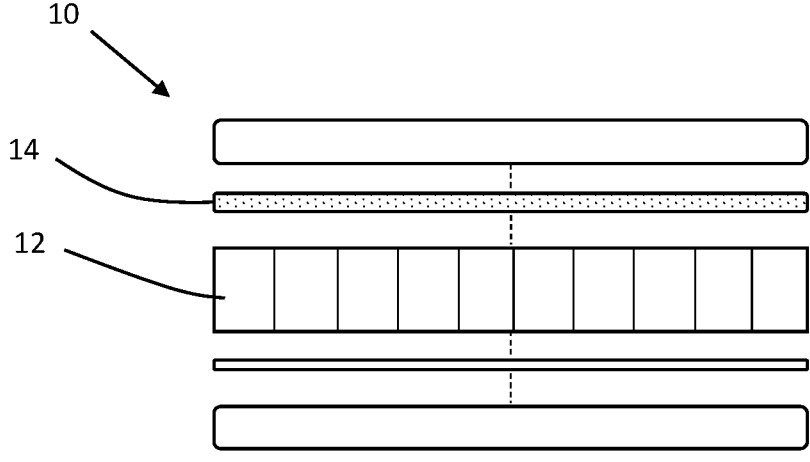
FIG. 1 is an exploded cross-section of a battery box assembly having an insulator material in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated herein in their entirety by reference for all purposes. Other combinations are also possible as will be gleaned from the following claims, which are also hereby incorporated herein in their entirety by reference into this written description.

Insulation materials, such as fibrous structures, may have a wide range of applications, such as in automotive applications, generator set engine compartments, commercial vehicle engines, in-cab areas, construction equipment, agriculture equipment, architectural applications, flooring, floormat under-layments, and even heating, ventilating and air conditioning (HVAC) applications. Insulation materials may be used for machinery and equipment insulation, motor vehicle insulation, domestic appliance insulation, dishwashers, and commercial wall and ceiling panels. Insulation material may be used in an engine cavity of a vehicle, on the inner and/or outer dash panels, or under the carpeting in the cabin, for example. Insulation materials may also provide other benefits, such as sound absorption, compression resiliency, stiffness, structural properties, and protection (e.g., to an item around which the insulation material is located).

The present teachings envision the use of a fibrous structure for providing insulation. The fibrous structure may be a multi-layer insulator material. For example, the fibrous structure as described herein may be at least partially formed or wrapped around a battery or another item to be insulated. An example of such an insulation structure can be found in U.S. Provisional Patent Application Nos. 63/074,691, filed on Sep. 4, 2020, and 63/106,458, filed on Oct. 28, 2020, both of which are incorporate herein in their entirety for all purposes.

Similarly, the fibrous structure may be disposed along at least one or more surfaces of a battery, may be positioned between adjacent batteries, or both. The fibrous structure as described herein may be located under a battery cover and/or within a housing of a battery system. The fibrous structure may be shaped to surround a plurality of sides of the battery, battery case, or other item to be insulated. The fibrous structure may be shaped to be located within a desired area of a vehicle, such as under a battery cover. The fibrous structure may be adapted to provide insulation to a solid-state battery, lithium-ion battery, or other type of battery. The fibrous structure may be assembled into a box-type structure for surrounding a battery. The fibrous structure may be used with a battery of an electric vehicle.

The fibrous structure may be formed at least partially into a shape or enclosure. The fibrous structure may be formed into a shape capable of being located under a battery cover, positioned between a battery pack and one or more batteries, or both. For example, the fibrous structure may meet constraint packaging requirements within a battery box or enclosure. To meet such constraints, the fibrous structure may have a thickness of about 1 mm or more about, 4 mm or more, or about 5 mm or more. The fibrous structure may have a thickness of about 15 mm or less, about 10 mm or less, or about 8 mm or less. Thus, the fibrous structure may have a thickness of about 1 mm to about 15 mm to meet a clearance within a battery enclosure (e.g., beneath a battery cover) of about 15 mm or less. The fibrous structure may be moldable or otherwise shaped, thereby allowing for mechanical features to be in-situ molded or for allowing fastening or assembly mechanisms to be included. The fibrous structure may have folding and/or bending functionality (i.e., to allow the structure to be secured around the item to be insulated or within the confines of the area to which it is positioned).

The fibrous structure may be used as a passive heat insulation product. The fibrous structure may be used in combination with an active temperature control system. The fibrous structure may act to reduce the energy required by the active temperature control system to maintain proper battery temperature. The fibrous structure may allow the active temperature control system to work less, or less hard, to maintain proper battery temperature. The fibrous structure may help maintain, increase, or minimize negative effects on range of the vehicle as compared with a battery system and active temperature control system without the fibrous structure. An "active temperature control system" may be, for example, an active cooling system, an active heating system, or an active heating/cooling system, all of which are within the scope of the present teachings.

The fibrous structure may act as thermal and/or acoustic insulation for occupants of the vehicle. As batteries of electric vehicles may operate at high temperatures, and such temperatures are undesirable within the vehicle interior, the fibrous structure may serve as a first insulation material, keeping the elevated temperatures in the area of the battery. Without acting as an insulator for the vehicle interior, the interior cooling system (e.g., HVAC system) would have to work harder, and the energy consumption required to cool the vehicle would lower the range of the vehicle.

The fibrous structure may act as a proactive safety device for occupants of the vehicle. The battery or battery systems within the vehicle may have a temperature controlled by the active temperature control system, the fibrous structure, or both. However, in fault conditions, the battery or battery system may reach extreme temperatures or create a thermal runaway event. In such an event, the battery or battery system my significantly degrade, thereby potentially releasing harmful chemicals and/or toxins within the battery into the atmosphere surrounding the battery or battery system. As a result, the harmful chemical and/or toxins may be combustible due to the increased temperature conditions, thereby creating a fire. In certain circumstances, a single battery cell may create a thermal runaway event and ignite a fire. As a result, the fire from the single battery cell may extend and/or propagate to surrounding battery cells within the battery system. In this particular case or similar cases, the fibrous structure may beneficially be positioned at least partially around or in between one or more batteries within the battery system. Thus, due to a high temperature resistance and/or one or more fire containment properties, the fibrous structure may limit the severity of a battery thermal runaway event that occurs.

Similarly, it is envisioned that the fibrous structure may protect the occupants of the vehicle during a thermal runaway event. For example, if the battery or battery system were to ignite, the fibrous structure may contain the heightened temperatures or fire from reaching the vehicle cabin for a desired duration of time. The desired duration may be defined as a duration of time after sensing of a thermal runaway event occurring. Such a duration of time may provide occupants within the vehicle sufficient time to safely exit the vehicle and reach a safe distance away from the vehicle. The duration of time to maintain a safe condition in the vehicle cabin after sensing of a thermal runaway event may be about 3 minutes or more, about 5 minutes or more, or about 10 minutes or more. The duration of time to maintain a safe condition in the vehicle cabin after sensing of a thermal runaway event may be about 20 minutes or less, about 15 minutes or less, or about 12 minutes or less. Similarly, the duration of time to maintain a safe condition in the vehicle cabin after sensing of a thermal runaway event may be even greater than 20 minutes. Examples of similar safety requirements may be found in industry-accepted vehicle safety requirements, such a Global Technical Requirement GTR20, Chinese safety standard GBMT38031, other safety requirements, or a combination thereof. It is envisioned that the fibrous structure described herein may meet one or all of the aforementioned safety requirements. Moreover, the fibrous structure may also surpass such safety requirements, thereby providing even better safety in a thermal runaway situation.

While batteries are specifically referenced herein, it is to be understood that the fibrous structure disclosed herein can be used to provide insulation to other items, and this disclosure is not limited to use with batteries. For example, other applications may include, but are not limited to, in-cabin insulation and/or external heat shielding for transportation and off-highway vehicles; thermoacoustic insulation in generator sets, air compressors, HVAC units, or other stationary or mobile mechanical unit where heat or noise is generated.

The fibrous structure may function to provide insulation, acoustic absorption, structural support and/or protection to the item around which the fibrous structure is formed or positioned. The fibrous structure can be adjusted based on the desired properties. For example, the fibrous structure may be tuned to provide a desired weight, thickness, compression resistance, or other physical attributes. The fibrous structure may be tuned to provide a desired thermal conductivity. The fibrous structure may be tuned to withstand elevated temperatures, exposure to flame, smoke, or toxicity, or a combination thereof.

The fibrous structure may be formed from nonwoven fibers. The fibrous structure may thus be a nonwoven structure. While referred to herein as the "fibrous structure," it is contemplated that any of the individual layers may have any or all of these properties or characteristics. Also, while referred to herein as a "fibrous structure," not all layers must be formed of fibers. It is contemplated that other materials, such as films, foils, adhesives, or other layers may be present in the fibrous structure.

The fibrous structure may be adapted to withstand high temperatures. One or more of the layers of the fibrous structure may have a temperature resistance of about 400° C. or greater, about 450° C. or greater, about 500° C. or greater, about 600° C. or greater, or about 700° C. or greater. One or more layers of the fibrous structure may have a temperature resistance of about 2500° C. or less, about 2000° C. or less, or about 1000° C. or less. The fibrous structure may be adapted to reduce temperature fluctuations experienced by the battery or item being insulated. The fibrous structure may provide thermal insulation for maintaining battery temperature (e.g., within about 15° C., about 20° C., about 25° C., about 35° C., or about 45° C.). The fibrous structure may serve as a fireblocker. The fibrous structure may block fire from extending beyond the enclosure of the fibrous structure (e.g., keeping fire from spreading should the battery catch fire). The fibrous structure may block fire from entering the enclosure of the fibrous structure (e.g., keeping fire from reaching the battery). The fibrous structure may be flame retardant. The fibrous structure meets UL 94V-0 flammability specifications (e.g., depending upon the application, required standards, or the like).

The fibers forming any of the layers of the fibrous structure may be natural or synthetic fibers. Suitable natural fibers may include cotton, jute, wool, cellulose, glass, and ceramic fibers. Suitable synthetic fibers may include polyester, polypropylene, polyethylene, Nylon, aramid, imide, acrylate fibers, or combination thereof. One or more layers of the fibrous structure may comprise polyester fibers, such as polyethylene terephthalate (PET), polybutylene terephthalate (PBT), and co-polyester/polyester (CoPET/PET) adhesive bi-component fibers. The fibers may include polyacrylonitrile (PAN), oxidized polyacrylonitrile (Ox-PAN, OPAN, or PANOX), olefin, polyamide, polyetherketone (PEK), polyetheretherketone (PEEK), polyether sulfone (PES), or other polymeric fibers. The fibers may include mineral or ceramic fibers. The fibers may be formed of any material that is capable of being carded, lapped, thermobonded, thermoformed, needlepunched, air laid, or other processing methods. The fibers may be formed of any material that is capable of being formed or shaped into a three-dimensional structure. The fibers may be 100% virgin fibers, or may contain fibers regenerated from postconsumer waste (for example, up to about 90% fibers regenerated from postconsumer waste or even up to 100% fibers regenerated from postconsumer waste). The fibers may have or may provide improved thermal insulation properties. The fibers may have relatively low thermal conductivity. The fibers may have geometries that are non-circular or non-cylindrical to alter convective flows around the fiber to reduce convective heat transfer effects within the three-dimensional structure. One or more layers of the fibrous structure may include or contain engineered aerogel structures to impart additional thermal insulating benefits.

The fibers forming one or more layers of the fibrous structure may include an inorganic material. The inorganic material may be any material capable of withstanding temperatures of about 250° C. or greater, about 400° C. or greater, about 500° C. or greater, about 750° C. or greater, about 1000° C. or greater. The inorganic material may be a material capable of withstanding temperatures up to about 1200° C. (e.g., up to about 1150° C.). The inorganic fibers may have a limiting oxygen index (LOI) via ASTM D2836 or ISO 4589-2 for example that is indicative of low flame or smoke. The LOI of the inorganic fibers may be higher than the LOI of standard binder fibers. For example, the LOI of standard PET bicomponent fibers may be about 20 to about 23. Therefore, the LOI of the inorganic fibers may be about 23 or greater. The inorganic fibers may have an LOI that is about 25 or greater. The inorganic fibers may be present in one or more of the layers of the fibrous structure in an amount of about 60 percent by weight or greater, about 70 percent by weight or greater, about 80 percent by weight or greater, or about 90 percent by weight or greater. The inorganic fibers may be present in one or more of the layers of the fibrous structure in an amount of about 100 percent by weight or less. The inorganic fibers may be selected based on its desired stiffness. The inorganic fibers may be crimped or non-crimped. Non-crimped organic fibers may be used when a fiber with a larger bending modulus (or higher stiffness) is desired. Where a fiber is needed to bend more easily, a crimped fiber may be used. The inorganic fibers may be ceramic fibers, glass fibers, mineral-based fibers, or a combination thereof. Ceramic fibers may be formed from polysilicic acid (e.g., Sialoxol or Sialoxid), or derivatives of such. For example, the inorganic fibers may be based on an amorphous aluminum oxide containing polysilicic acid. Siloxane, silane, and/or silanol may be added or reacted into one or more layers of the fibrous structure to impart additional functionality. These modifiers could include carbon-containing components.

The fibers, or at least a portion of the fibers, may have high infrared reflectance or low emissivity. At least some of the fibers may be metallized to provide infrared (IR) radiant heat reflection. An entire layer of the material may be infrared reflective. To provide heat reflective properties to and/or protect one or more of the layers of the fibrous structure, the fibers or one or more layers (or a portion thereof) of the fibrous structure may be metalized. For example, fibers may be aluminized. The fibers themselves may be infrared reflective (e.g., so that an additional metallization or aluminization step may not be necessary). The layers themselves may be infrared reflective. Metallization or aluminization processes can be performed by depositing metal atoms onto the fibers and/or one or more layers of the fibrous structure. As an example, aluminization may be established by applying a layer of aluminum atoms to the surface of fibers. Metalizing may be performed prior to the application of any additional layers one or more of the layers of the fibrous structure. It is contemplated that other layers of the fibrous structure may include metallized fibers in addition to, or instead of, having metallized fibers within the layer.

The metallization may provide a desired reflectivity or emissivity. The metallized fibers may be about 50% IR reflective or more, about 65% IR reflective or more, or about 80% IR reflective or more. The metallized fibers may be about 100% IR reflective or less, about 99% IR reflective or less, or about 98% IR reflective or less. For example, the emissivity range may be about 0.01 or more or about 0.20 or less, or 99% to about 80% IR reflective, respectively. Emissivity may change over time as oil, dirt, degradation, and the like may impact the fibers in the application.

Other coatings may be applied to the fibers, metallized or not, to achieve desired properties. Oleophobic and/or hydrophobic treatments may be added. Flame retardants may be added. A corrosion resistant coating may be applied to the metalized fibers to reduce or protect the metal from oxidizing and/or losing reflectivity. IR reflective coatings not based on metallization technology may be added.

Similarly, the fibers or one or more layers of the fibrous structure may be treated with one or more intumescent solutions. The intumescent solutions may expand on exposure to heat, thereby even further improving the heat and/or fire resistance of the fibrous structure. The intumescent solutions may be disposed on one or more surface of the fibrous structure. The intumescent solutions may be disposed on one or more outer surfaces, one or more inner surfaces, one or more intermediary surfaces, or a combination thereof. For example, only the outer surfaces may be treated with an intumescent solution, each layer of the fibrous structure may be treated with an intumescent solution, or only the inner surfaces may be treated with an intumescent solution.

One or more of the layers of the fibrous structure may include a binder or binder fibers. Binder may be present in one or more layers of the fibrous structure in an amount of about 40 percent by weight or less of the layer, about 30 percent by weight or less, about 25 percent by weight or less, or about 15 percent by weight or less. One or more of the layers of the fibrous structure may be substantially free of binder. One or more of the layers of the fibrous structure may be entirely free of binder. While referred to herein as fibers, it is also contemplated that the binder could be generally powder-like, spherical, or any shape capable of being received within interstitial spaces between other fibers (e.g., inorganic fibers) and capable of binding one or more of the layers of the fibrous structure together. The binder may have a softening and/or melting temperature of about 180° C. or greater, about 200° C. or greater, about 225° C. or greater, about 230° C. or greater, or even about 250° C. or greater. The binder may be a thermoplastic binder, a thermoset binder, or both. The fibers may be high-temperature thermoplastic materials. The fibers may include one or more of polyamideimide (PAI); high-performance polyamide (HPPA), such as Nylons; polyimide (PI); polyketone; polysulfone derivatives; polycyclohexane dimethyl-terephthalate (PCT); fluoropolymers; polyetherimide (PEI); polybenzimidazole (PBI); polyethylene terephthalate (PET); polybutylene terephthalate (PBT); polyphenylene sulfide; syndiotactic polystyrene; polyetherether ketone (PEEK); polyphenylene sulfide (PPS), polyether imide (PEI); and the like. One or more of the layers of the fibrous structure may include polyacrylate and/or epoxy (e.g., thermoset and/or thermoplastic type) fibers. One or more of the layers of the fibrous structure may include a multi-binder system. One or more of the layers of the fibrous structure may include one or more sacrificial binder materials and/or binder materials having a lower melting temperature than the inorganic fibers.

One or more of the layers of the fibrous structure may include a plurality of bi-component fibers. The bi-component fibers may be a thermoplastic lower melt bi-component fiber. The bi-component fibers may have a lower melting temperature than the other fibers within the mixture (e.g., a lower melting temperature than common or staple fibers). The bi-component fiber may be of a flame-retardant type (e.g., formed from or including flame retardant polyester). The bi-component fibers may enable one or more of the layers of the fibrous structure to be air laid or mechanically carded, lapped, needlepunched, and/or fused in space as a network so that the material may have structure and body and can be handled, laminated, fabricated, installed as a cut or molded part, or the like to provide insulation properties, acoustic absorption, or both. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which one or more of the layers of the fibrous structure is heated to soften the sheath material of the bi-component may depend upon the physical properties of the sheath material. The bi-component fibers may be formed of short lengths chopped from extruded bi-component fibers. The bi-component fibers may have a sheath-to-core ratio (in cross-sectional area) of about 10% or more, about 20% or more, or about 25% or more. The bi-component fibers may have a sheath-to-core ratio of about 50% or less, about 40% or less, or about 35% or less.

The fibers of one or more of the layers of the fibrous structure may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation. Any, a portion, or all of the fibers used in one or more of the layers of the fibrous structure could be of the low flame and/or smoke emitting type (e.g., for compliance with flame and smoke standards for transportation).

The fibrous structure may include a plurality of layers. One or more of the layers may include any of the fibers described herein. One or more of the layers may be free of fibers (e.g., a foil, film, adhesive, or the like). The layers may provide desired properties or characteristics. The layers, or combinations thereof, may be selected to achieve particular results. The layers may provide enhanced properties together than each layer would provide separately. Each layer of the fibrous structure may be a different material. The fibrous structure may have some layers that are the same. The fibrous structure may have layers with similar or same components but different densities, thicknesses, weight of material, method of distributing the fibers (e.g., lapping vs needle punching), the like, or combination thereof. The fibrous structure may have layers that are different. Each layer of the fibrous structure may be different from the layer directly adjacent. The fibrous structure may have one or more layers directly adjacent to another layer, where the layers are the same.

The fibrous structure may include a metallic or metallized layer. The layer may be located on an outermost surface of the fibrous structure to provide heat and/or infrared reflection. The metallic or metallized layer may be adapted to face the item to be insulated. The metallic or metallized layer may be adapted to face away from the item to be insulated (i.e., the outermost layer of the fibrous structure when assembled). The fibrous structure may include two or more metallic or metallized layers. The metallic or metallized layer may offer resistance to weathering, mold, UV, extreme environmental conditions, or a combination thereof. The material may withstand demanding temperature and humidity conditions. The material may act to seal in temperatures to reduce temperature fluctuations to which the item to be insulated is exposed. The metallic or metallized layer may act as a barrier (e.g., moisture barrier, chemical barrier, flame barrier, or the like). The metallic or metallized layer may provide support and/or reinforcement to the fibrous structure or one or more layers thereof. The metallic or metallized layer may provide protection to other layers of the fibrous structure (e.g., by providing puncture resistance). The metallic or metallized layer may resist failure from common sources of degradation, including moisture, UV rays, extreme temperature conditions, and chemicals.

The metallic or metallized layer may be a foil, coating, sheet, deposition of metal atoms on a surface of a material, or the like. The metallic or metallized layer may be reinforced (e.g., with ribs). The metallic layer may have one or more substantially smooth surfaces, one or more embossed surfaces, or both. The metallic or metallized layer may be reinforced, for example, by wire, fibers, additives, mesh, or the like. The metallic or metallized layer may be formed of a metal or metal alloy. For example, the metallic or metallized layer may be formed of aluminum (e.g., an aluminum foil), stainless-steel (e.g., a stainless-steel foil such as SS-304 or SS-430), or both.

The metallic or metallized layer may have a thickness sufficient to provide the desired properties or protection. The metallic or metallized layer may have a thickness of about 50 micrometers or greater, about 100 micrometers or greater, or about 150 micrometers or greater. The metallic or met-allized layer may have a thickness of about 250 micrometers or less, about 200 micrometers or less, or about 150 microm-eters or less.

The fibrous structure may include one or more layers having fibers capable of withstanding high temperatures. The fibrous structure may include one or more layers having fibers that do not burn, melt, soften, and/or drip. The fibers may provide effective protection against fire and/or heat. The fibrous structure may include one or more layers having fibers that are resistant to many or most solvents and chemicals. The fibrous structure may include one or more layers having fibers with a low permeability to gases.

Fibers capable of withstanding high temperatures may be organic fibers. The fibers may be formed of or include a synthetic thermoplastic polymer resin. For example, the fibers may be polyacrylonitrile fibers. The polyacrylonitrile fibers may be oxidized polyacrylonitrile fibers, such as Ox-PAN, OPAN, or PANOX.

The one or more layers may include polyacrylonitrile fibers or oxidized polyacrylonitrile fibers in the layer in an amount of about 50 wt % or greater of the layer, about 70 wt % or greater, or about 75 wt % or greater. The one or more layers may include polyacrylonitrile fibers or oxidized poly-acrylonitrile fibers in an amount of about 100 wt % or less. The layer may include other components, such as other thermoplastic polymer materials. The layer may comprise polyester fibers, such as polyethylene terephthalate (PET), polybutylene terephthalate (PBT), and co-polyester/polyes-ter (CoPET/PET) adhesive bi-component fibers. The fibers may include olefin, polyamide, polyetherketone (PEK), polyetheretherketone (PEEK), polyether sulfone (PES), or other polymeric fibers. The fibers may include mineral or ceramic fibers. For example, the material may contain about 70 wt % polyacrylonitrile fibers or about 70 wt % oxidized polyacrylonitrile fibers and up to about 30 wt % PET.

The one or more layers including these fibers may have a temperature resistance of up to and including about 200° C., up to and including about 400° C., up to and including about 750° C., up to and include about 1,000° C., up to and including about 1,200° C., or even higher.

The fibers, such as polyacrylonitrile fibers (which may be or may include oxidized polyacrylonitrile fibers), may be used to form a nonwoven layer. The fibers forming the nonwoven layer may be formed into a nonwoven web using nonwoven processes including, for example, blending fibers, carding, lapping (e.g., vertical lapping, cross-lapping), ther-mobonding, air laying, mechanical formation, needle punch-ing, or a combination thereof. The layer may have a weight of about 100 g/m2 or greater, about 200 g/m2 or greater, or about 400 g/m2 or greater. The layer may have a weight of about 100 g/m2 or less, about 750 g/m2 or less, or about 500 g/m2 or less.

The fibrous structure may include two or more layers having these polyacrylonitrile fibers. The layers may be the same relative to each other. The layers may be different relative to each other (e.g., by structure of the nonwoven material, orientation of the fibers, weight of the material, or the like). The fibrous structure may include some layers that are the same and some layers that are different.

For example, a fibrous structure may include one or more polyacrylonitrile or oxidized polyacrylonitrile fiber layers formed by needle punching. The needle-punched layer may have a weight of about 200 g/m2 to about 1,500 g/m2. The fibrous structure may include one or more polyacrylonitrile or oxidized polyacrylonitrile fiber layers formed by cross-lapping. The cross-lapped layer may have a weight of about 400 g/m2. The fibrous structure may include two or more needle-punched layers of polyacrylonitrile or oxidized poly-acrylonitrile fibers. The fibrous structure may include two or more cross-lapped layers of polyacrylonitrile or oxidized polyacrylonitrile fibers. The fibrous structure may include a combination of needle-punched and cross-lapped polyacry-lonitrile or oxidized polyacrylonitrile fiber layers.

The fibrous structure may include one or more layers having inorganic fibers or fibers made from inorganic mate-rials. These fibers may be capable of withstanding high temperatures, provide thermal stability, or both. One or more layers or the fibers therein may be non-combustible. One or more layers or the fibers therein may have high-porosity, provide acoustic absorption, or a combination thereof. One or more layers or the fibers therein may exhibit high tem-perature duration, low heat shrinkage, low heat loss, or a combination thereof.

One or more layers of the fibrous structure having inor-ganic fibers may have up to 100 wt % of the layer inorganic fibers. One or more layers of the fibrous structure may have inorganic fibers in an amount of about 50 wt % or greater of the layer, about 70 wt % or greater, or about 90 wt % or greater.

The fibrous structure may include one or more layers including E-glass. The fibers forming the E-glass layer may resist thermal expansion, which may keep the shape and size of the layer constant despite exposure to temperature fluc-tuations. The fibers may provide high strength and stiffness at low weight. The fibers may exhibit low values for dielectric constant, dielectric loss, or both. The fibers, or layer formed by the fibers, may have a temperature resis-tance up to and including about 500° C., about 600° C., or about 640° C., or even higher.

The E-glass layer may include any of silica, alumina, calcium oxide (CaO), boron oxide (B2O3). The E-glass inorganic materials may be enveloped by a resin, such as an epoxy resin. The layer may be formed by any suitable process, including but not limited to needle punching to form a mat.

The E-glass fibers may be free of boron oxide. Such boron-free material is referred to as E-CR glass. The E-CR glass may provide acid and/or chemical resistance. The E-CR glass may provide increased temperature resistance. The fibers, or layer formed by the fibers, may have a temperature resistance up to and including about 600° C., about 650° C., or about 700° C., or even higher. An E-CR glass layer may be formed by any suitable process, including but not limited to needle punching to form a mat.

The fibrous structure may include one or more layers having fibers forming a high-silica nonwoven material. The layer may be formed by any suitable process, including but not limited to needle punching to form a mat. The layer may be formed by silica fibers in any amount up to 100 wt % of the layer. The fibers, or layer formed by the fibers, may have a temperature resistance up to and including about 900° C., about 1000° C., about 1100° C., or even higher.

The fibrous structure may include one or more layers of a ceramic blanket or paper. The ceramic blanket or paper layer may provide improved handling strength, enhanced thermal properties, or both. The ceramic blanket or paper layer may exhibit outstanding insulating properties at elevated temperatures. The ceramic blanket or paper layer may have excellent thermal stability. The ceramic blanket or paper layer may have a temperature resistance up to and including about 1000° C., about 1200° C., or about 1300° C., or even greater. The ceramic blanket or paper may be flexible, easy to cut and shape, or a combination thereof. The ceramic blanket or paper may have good resistance to tearing. The ceramic blanket may exhibit low heat storage. The ceramic blanket or paper may provide sound absorption. The ceramic blanket or paper layer may be formed by any suitable process, including but not limited to needle punching. Similarly, the ceramic blanket or paper may include one or more binders to form the ceramic blanket or paper.

The ceramic blanket or paper may be substantially free of binder (e.g., about 1 wt % or less of the layer). The ceramic blanket or paper may be entirely free of binder. The ceramic blanket or paper may be formed of inorganic materials in an amount up to and including about 100 wt % of the layer. For example, the ceramic blanket or paper may comprise silicon dioxide ($SiO2$), calcium oxide (CaO), and magnesium oxide (MgO). One particular ceramic blanket or paper may be a Superwool® blanket or paper.

The fibrous structure may include one or more layers of fiberglass. For example, one or more of the layers may be black glass cloth. The fiberglass may impart high temperature resistance and thermal stability. The fiberglass layer may provide abrasion resistance. The fiberglass layer may be resistant to tearing. The fiberglass layer may exhibit solvent resistance.

The nonwoven materials of the present teachings may be formed using any method that produces a material having the desired properties. This is including, but not limited to, carding, air laying, wet laying, spun-bonding, melt-blowing, electro-spinning, lapping (e.g., vertically lapping, cross-lapping), needle punching, or any combination thereof.

The present teachings contemplate any combination of layers described herein, including but not limited to: a metallic layer, such as stainless-steel (e.g., SS-304 or SS-430) or an aluminized layer; a polyacrylonitrile fiber-based or oxidized polyacrylonitrile fiber-based layer (formed by any process, such as needle punching and/or lapping, such as cross-lapping); and inorganic fiber layer formed from E-glass, E-CR glass, a high silica nonwoven, fiberglass, ceramic blanket.

The layers of material forming the fibrous structure may be secured together to create the finished fibrous structure. One or more layers may be bonded together by elements present in the layers. For example, binder fibers in one or more layers may serve to bond layers together. The outer layers (i.e., the sheath) of bi-component fibers in one or more layers may soften and/or melt upon the application of heat, which may cause the fibers of the individual layers to adhere to each other and/or to adhere to the fibers of other layers. Layers may be attached together by one or more lamination processes. One or more adhesives may be used to join two or more layers. The adhesives may be a powder or may be applied in strips, films, sheets, or as a liquid, for example. The one or more layers may be secured to each other using any other process suitable for the intended use, such as stitching, mechanical bonding, heat sealing, sonic or vibration welding, pressure welding, the like, or a combination thereof.

The total thickness of the fibrous structure may depend upon the number and thickness of the individual layers. The fibrous structure may have 2 or more layers, 3 or more layers, or 4 or more layers. The fibrous structure may have 10 or less layers, 8 or less layers, or 6 or less layers. Thus, it envisioned that the number of layers may be selected based on a desired application, packaging constraints, performance requirements, or a combination thereof.

The fibrous structure may be shaped or positioned to at least partially surround an item to be insulated. The fibrous structure may be thermoformed into a desired shape. The fibrous structure may be bent, folded, or otherwise situated into a desired shape. The fibrous structure may be an at least partial enclosure for a battery or a battery case. The fibrous structure may be shaped to fit within particular confines of a vehicle. For example, the fibrous structure may be shaped to fit below or within the confines of a battery cover of a vehicle. The fibrous structure may be formed from a multi-layer piece. The fibrous structure may be formed from multiple multi-layer pieces. The fibrous structure may be formed from individual pieces secured together. For example, generally planar pieces may be secured at one or more edges to form a shape capable of surrounding the item to be insulated. One or more pieces may be movable or removable to provide access to the battery at least in particular areas.

The fibrous structure may have one or more generally planar portions. The generally planar portion may be generally coplanar with a face or surface of a battery or a battery case. The generally planar portion may be located beneath or within a battery cover of a vehicle. One or more sides may extend from the generally planar portion. The sides may be shaped to fit within the confines of a battery cover. The sides may be shaped to fit around a battery or a battery case.

The fibrous structure may form a box-shape that at least partially surrounds the battery or the battery case. The battery box may have a top cover portion that is adapted to be generally coplanar with a large face of the battery or the battery case. The battery box may have one or more side cover portions that are adapted to be generally coplanar with a side of the battery. The side cover portions may be generally elongated in a similar dimension to the side of the battery to which it corresponds. One or more side cover portions may include one or more cutouts or openings to accommodate features of the battery or battery case, including but not limited to ports, wires, terminals, caps, connectors, prongs, and vents.

Turning now to the figures, FIG. 1 illustrates an exploded cross-section of an exemplary battery box assembly 10 for providing insulation to a battery 12. The battery box assembly 10 includes an insulator material 14 positioned adjacent to the battery or one or more battery modules 12 to insulate the battery or one or more battery modules 12, to contain dangerous heat and/or fire initiated within the battery box assembly 10, or both. For example, the insulator material 14 may help manage or protect one or more surrounding areas from a battery or one or more battery cells 12 in a thermal runaway management event. The insulator material 14 may prevent heightened temperatures and/or fire from the battery or one or more battery cells 12 from reaching one or more adjacent batteries within a battery system, from reaching a cabin of a vehicle, from reaching other surrounding areas, or a combination thereof. As discussed above, the protection from the insulator material 14 may be for a desired duration of time to provide occupants ample time to safely exit the vehicle and reach safety from the thermal runaway.

As shown, the insulator material 14 may be located within the battery box assembly 10 beneath an upper battery cover 11A to be located directly adjacent to the battery or one or more battery cells 12. However, the insulator material 14 or additional insulator materials may be located anywhere within and/or surrounding the battery box assembly 10 to aid in insulation, safety, or both. For example, the insulator material 14 may be located adjacent to a lower cover 11B of the battery box assembly 10, adjacent to additional battery box componentry (i.e., a cooling system, a control module, other circuitry, etc.), or a combination thereof. Beneficially, the insulator material 14 may meet tight packaging constraints to provide a substantially thinner insulating material when compared to conventional insulators, yet still maintain insulative and/or safety properties.

Figure 2:
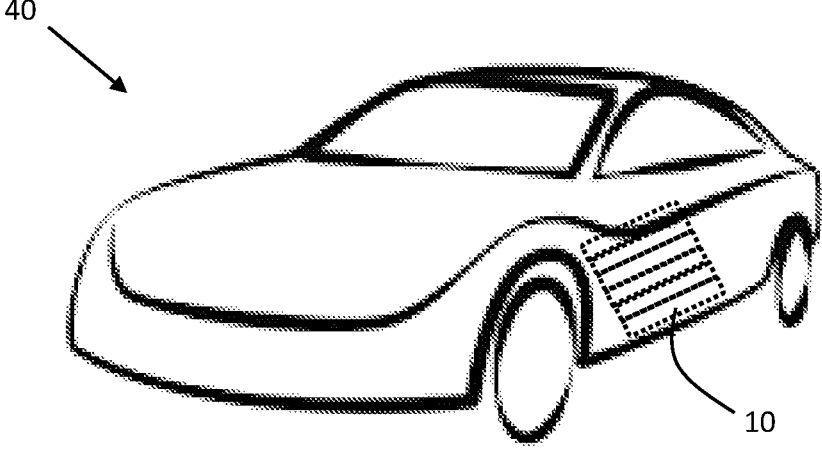
FIG. 2 is a perspective view of a vehicle having a battery box assembly in accordance with the present teachings.

FIG. 2 illustrates an exemplary position of a battery box assembly 10 within a vehicle 40. As shown, the battery box assembly 10 may be positioned beneath an underbody of the vehicle directly beneath the vehicle cabin. Similarly, battery box assemblies may be located under a hood and/or rear portion of the vehicle. As a result, these battery box assemblies may pose a significant risk to an occupant within the vehicle if the batteries. Advantageously, the insulator material 14 as shown in FIG. 1 may help protect and/or prevent dangerous conditions such as thermal runaway from reaching the vehicle cabin for a desired duration of time, thereby allowing occupants to exit the vehicle safely.

Figure 3:
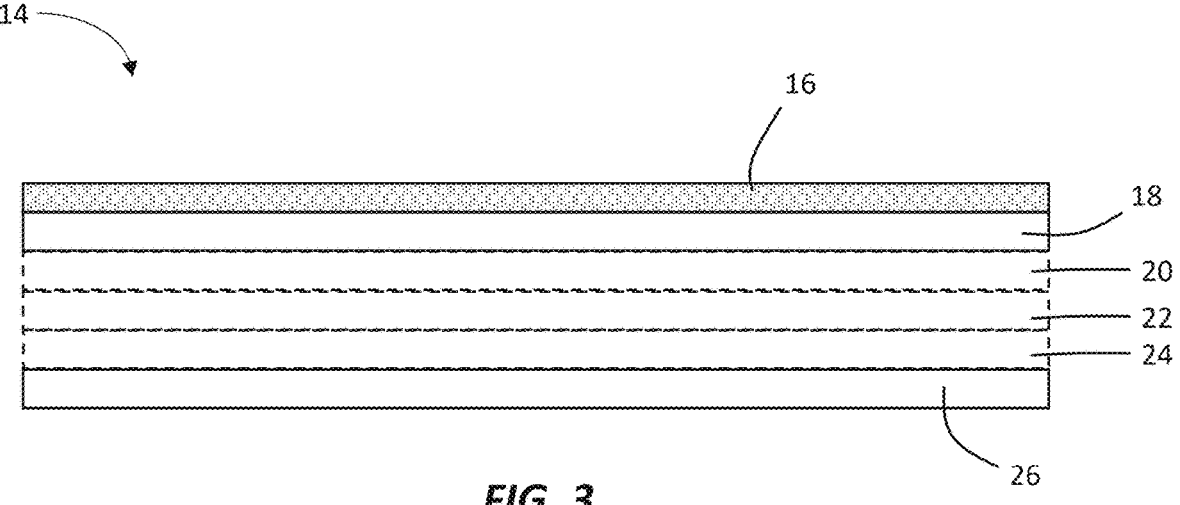
FIG. 3 is a cross-section of a multi-layered insulator material in accordance with the present teachings.

FIG. 3 illustrates an exemplary cross-section of multi-layered insulator material 14 in accordance with the present teachings. The insulator material 14 includes a top layer 16, a second layer 18, and a third layer 20. The insulator material 14 may optionally include any of a fourth layer 22, a fifth layer 24, or a sixth layer 26.

Figure 4:
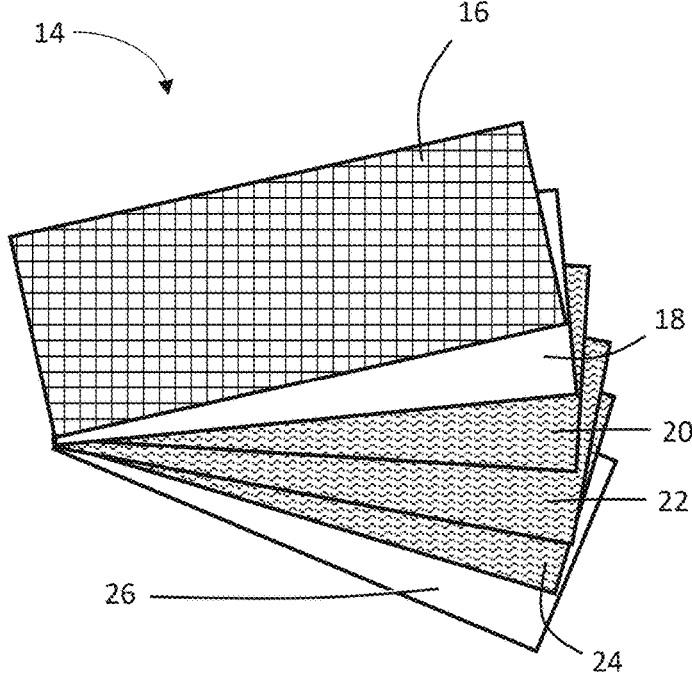
FIG. 4 is a perspective, exploded view of a multi-layered insulator material in accordance with the present teachings.

FIG. 4 illustrates an exploded layer view of a multi-layered insulator material 14 in accordance with the present teachings. A top layer 16 of the insulator material 14 may be a metallic facing layer, such as an aluminum foil, a stainless-steel foil, or other metallic material. A second layer 18 adjacent to the top layer 16 may be a nonwoven layer including oxidized polyacrylonitrile fibers. The second layer 18 may be needlepunched. A third layer 20, a fourth layer 22, and a fifth layer 24 may each be a cross-lapped nonwoven layer. Additionally, a sixth layer 26 may be a nonwoven layer including oxidized polyacrylonitrile fibers. Additionally, one or more of the layers described above may be treated with one or more intumescent solutions.

FIGS. 7A-7C illustrate top-down views of various configurations of a multi-layered insulator material 14. As discussed above, the insulator material 14 may include a plurality of layers to facilitate tuning of the insulator material 14 for various applications. However, it is envisioned that the insulator material 14 may be particularly suited for thermal runaway management and/or thermal insulation of a vehicle battery. That is, the insulator material 14 may be advantageously applied to protect one or more vehicle in a battery fire containment situation.

In certain cases, a battery of a vehicle being insulated may be defective or overheated, thereby causing a battery fire and/or battery explosion. In such a situation, the insulator material 14 may provide protection to an exterior region when the battery creates a fire and/or explodes. In such a case, as shown in FIGS. 7A-7C the insulator material 14 may be positioned so that a portion of the insulator material 14 may be defined as an exposure region 30. The exposure region 30 may be correlated to a portion of the insulator material 14 that is directly exposed to the battery fire and/or the battery explosion. However, it should be noted that such an exposure region 30 may be any size and/or shape relative to the overall coverage of the insulator material 14.

During such battery fires and/or explosions, the insulator material 14 may be configured to deflect or otherwise dissipate the extreme heat temperatures created. As discussed in further detail below, the insulator material 14 may thermally insulate a battery compartment so that the extreme temperatures caused by the battery fire and/or explosion are significantly reduced when reaching the outside region.

In addition to thermal insulation, the insulator material 14 may also beneficially guide or otherwise direct the excess heat and/or gases transferred from the battery. To do so, the insulator material 14 may have one or more patterns created from stitching 28 portions of the insulator material 14, thereby creating one or more pockets 32 and/or grooved regions therebetween. The pockets 32 may be defined as regions between stitching 28 while the grooves may be defined as any region having a localized decrease in thickness. Such grooves may be caused by the stitching or other means, such as an adhesive or other type of mechanical fastener.

As shown in FIG. 7A, the stitching 28 may form a perimeter stich substantially along a perimeter of the insulator material 14 to create a single pocket 32 in a central region of the insulator material 14. However, various other patterns may be utilized based upon a given application. For example, as shown in FIG. 7B, a plurality of vertical stitching 28 extending between opposing sides of the insulator material 14 may be present. Similarly, as shown in FIG. 7C, the stitching 28 may create a hatched pattern where both horizontal and vertical stitching 28 create a plurality of pockets 32 throughout the insulator material 14.

Thus, it may be envisioned that other type of stitching patterns not shown may also be possible. For example, the stitching may create a zig-zag pattern, a unidirectional pattern, a bidirectional pattern, a randomized pattern, any desired thickness of each stitch line, or a combination thereof. As such, the stitching may beneficially provide an additional parameter for further tuning of the insulator material 14. That is, the stitching may advantageously displace and/or transfer gases or heat in a more predictable manner to direct such gases or heat in a desired direction.

Additionally, it should be noted that while stitching 28 may be utilized to direct gases and/or heat, the insulator material 14 may also be optimized to dissipate pressure changes caused by the battery fire and/or explosion. For example, as discussed above, the insulator material may include a plurality of pockets 28. The pockets 28 may provide a lofted region of the insulator material 14 that has a localized thickness greater than a stitched and/or grooved region. As a result, the lofted region in the pockets 28 may provide greater air-permeability when compared to a more compressed region having a thinner thickness. Therefore, the pockets 28 may beneficially allow for greater air-permeability to dissipate increased pressure caused by the battery fire and/or explosion.

FIG. 7D illustrates internal fire testing performance of the various configurations of multi-layered insulator material 14 shown in FIGS. 7A-7C. Samples of each stitching pattern (i.e., a boundary stitching, an X-direction stitching, and an X and Y-direction stitching) were created having a thickness of approximately 5 mm to 6 mm. The samples then underwent fire testing as a barrier upon exposure to 900° C. on a "hot" (i.e., exposed) side of the insulator material 14. The graph shown in FIG. 7D illustrates a temperature of an opposing "cool" (i.e., unexposed) side of the insulator material 14 over a duration of 20 minutes during the exposure. As can be seen, performance of insulator material 14 having an X and Y-direction stitching (FIG. 7C) performed the best with respect to maintaining a cooler temperature on the "cool" side of the insulator material 14 when compared to either a boundary stitching (FIG. 7A) or an X-direction stitching (FIG. 7B)

ILLUSTRATIVE EXAMPLES

As shown in Table 1 below, six different multi-layered insulator material configurations in accordance with the present teachings were tested to determine passive thermal insulation performance. Testing was carried out at 900° C. and for a duration of 30 minutes, with the percentage of temperature change (Delta T values) being recorded each minute.

exposed side over a duration of 15 minutes, thereby protecting an outside area adjacent to a battery system. Advantageously, Constructions 1-6 all maintain a decreased temperature of less than about 170° C., or in some instances less than about 140° C., on an opposing side of the insulator material to that of the exposed side.

TABLE 1

| | Delta T (BFC) Set Temp: 900 | | | | | |
|---|---|---|---|---|---|---|
| Time for Temp. Reading (min) | Construction 1 | Construction 2 | Construction 3 | Construction 4 | Construction 5 | Construction 6 |
| 1 | 52 | 110 | 50 | 53 | 48 | 46 |
| 2 | 74 | 110 | 71 | 62 | 64 | 61 |
| 3 | 105 | 130 | 98 | 79 | 84 | 81 |
| 4 | 128 | 145 | 123 | 94 | 98 | 101 |
| 5 | 144 | 149 | 132 | 105 | 109 | 113 |
| 6 | 156 | 151 | 132 | 112 | 117 | 118 |
| 7 | 157 | 151 | 133 | 117 | 121 | 127 |
| 8 | 159 | 151 | 133 | 121 | 123 | 129 |
| 9 | 160 | 151 | 135 | 123 | 126 | 131 |
| 10 | 162 | 151 | 135 | 126 | 129 | 133 |
| 11 | 162 | 151 | 135 | 127 | 129 | 135 |
| 12 | 163 | 153 | 133 | 128 | 128 | 137 |
| 13 | 164 | 153 | 133 | 129 | 130 | 137 |
| 14 | 165 | 152 | 134 | 130 | 131 | 138 |
| 15 | 166 | 154 | 133 | 131 | 132 | 139 |
| 16 | 167 | 153 | 135 | 130 | 133 | 137 |
| 17 | 168 | 152 | 135 | 128 | 135 | 138 |
| 18 | 169 | 141 | 135 | 129 | 136 | 139 |
| 19 | 170 | 139 | 134 | 130 | 134 | 138 |
| 20 | 170 | 139 | 134 | 130 | 134 | 140 |
| 21 | 169 | 139 | 135 | 131 | 135 | 140 |
| 22 | 170 | 139 | 136 | 131 | 136 | 139 |
| 23 | 169 | 139 | 135 | 131 | 135 | 140 |
| 24 | 169 | 139 | 135 | 132 | 133 | 140 |
| 25 | 168 | 138 | 131 | 133 | 132 | 142 |
| 26 | 168 | 139 | 132 | 133 | 132 | 141 |
| 27 | 168 | 140 | 131 | 133 | 132 | 140 |
| 28 | 167 | 141 | 131 | 133 | 132 | 140 |
| 29 | 168 | 142 | 132 | 131 | 132 | 139 |
| 30 | 168 | 141 | 133 | 132 | 133 | 140 |

As illustrated above, all six configurations maintained a temperature on an opposing side of the exposed portion of the insulator material within 200° C. based upon the Delta T values measured.

Figure 5:
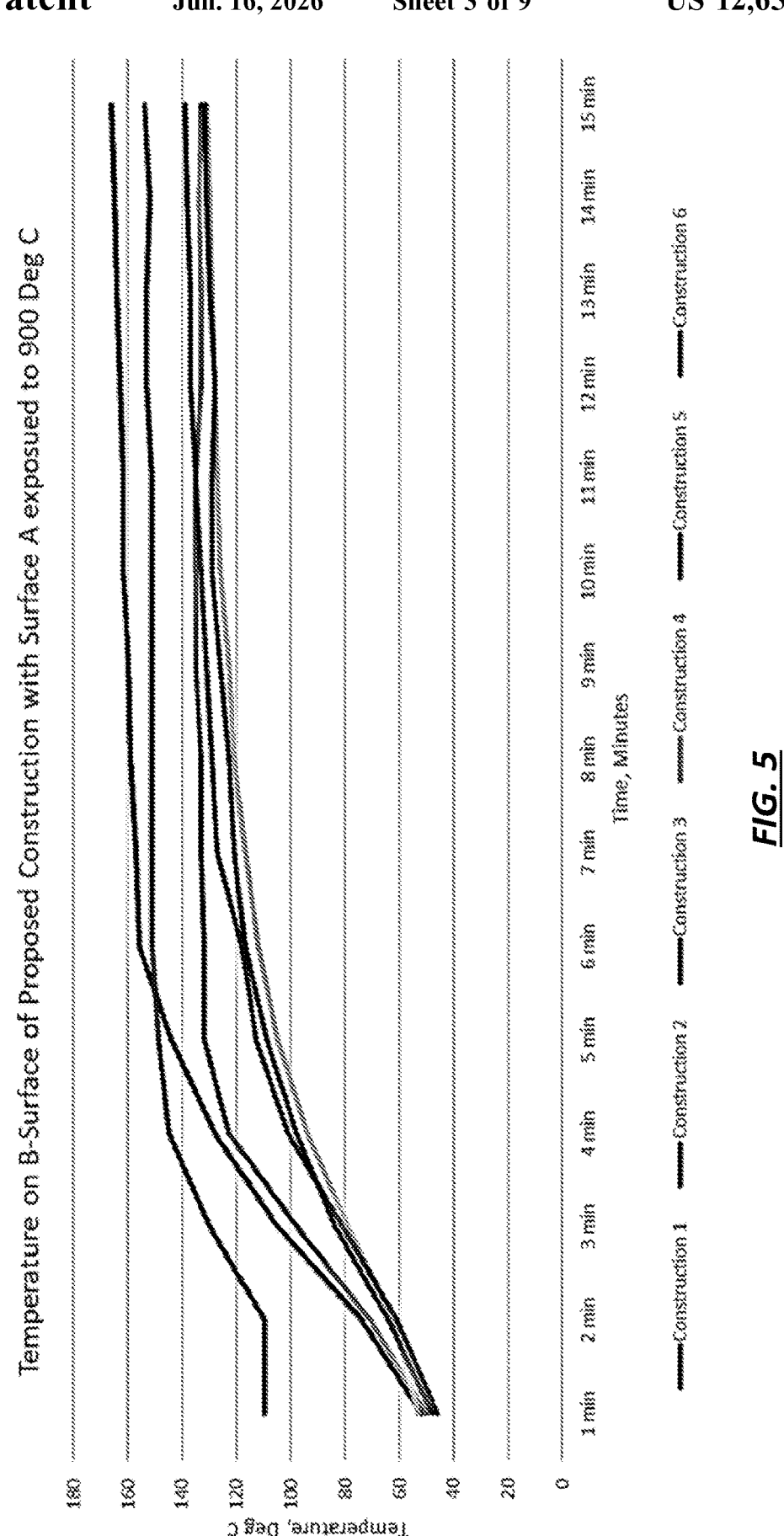
FIG. 5 is a graph illustrating an exemplary multi-layered insulator material construction's performance during exposure to heightened temperatures.

Similarly, FIG. 5 illustrates the performance of insulator material based upon the insulator material Constructions 1-6 identified above upon exposure to heat. As shown, upon Additionally, Table 2 below illustrates material properties of various insulator material configurations in accordance with the present teachings. Thermal conductivity testing was standardized and completed upon each of eight samples. The samples varied in configuration, number of layers, types of layers, or a combination thereof.

TABLE 2

| Sample Number | Mean Temp (Deg C) | Delta Temp (Deg C) | Thermal Conductivity (W/m-k) | Thermal Resistance (M²*k/w) | Thermal Conductivity (Clo/Inch) | Thermal Resistance (Clo) | Temperature Gradient (*k/m) |
|---|---|---|---|---|---|---|---|
| 1 | 22.5 | 10.00 | 0.027459 | 0.364180 | 5.977064 | 2.353188 | 961.03 |
| 2 | 22.5 | 10.00 | 0.025566 | 0.391138 | 6.419495 | 2.527375 | 946.59 |
| 3 | 22.5 | 10.00 | 0.024270 | 0.412036 | 6.762488 | 2.662412 | 946.26 |
| 4 | 22.5 | 10.00 | 0.021439 | 0.466445 | 7.655465 | 3.013980 | 953.67 |
| 5 | 22.5 | 10.00 | 0.026098 | 0.383165 | 6.288653 | 2.475862 | 943.45 |
| 6 | 22.5 | 10.00 | 0.023313 | 0.428944 | 7.039990 | 2.771665 | 949.38 |
| 7 | 22.5 | 10.00 | 0.040314 | 0.421688 | 4.071120 | 2.724781 | 557.51 |
| 8 | 22.5 | 10.00 | 0.029993 | 0.333407 | 5.472007 | 2.154346 | 958.30 | exposure to a heightened temperature of 900° C., the insulator material may beneficially limit a temperature on an opposing side of the insulator material relative to the As shown above, the present teachings may beneficially provide a high degree of tunability for the insulator material. As a result, the insulator material may be configured for desired material characteristics, cost requirements, or both based upon the types of materials used, the number of layers, configuration of the layers, or a combination thereof.

Additionally, as shown in Table 3 below, two (e.g., Type 1 and Type 2) different multi-layered insulator material configurations in accordance with the present teachings were tested to determine passive thermal insulation performance. While configurations may be different between Type 1 and Type 2, each material configuration tested had an overall thickness of 4 mm. Testing was carried out at 900° C. exposed to a surface of the samples for a duration of 20 minutes, with the percentage of temperature change (Delta T values) being recorded each minute.

TABLE 3

Delta T for BFC constructions with 4 mm thk
Set Temp: 900 Deg C.

| Time for Temp. Reading Time | Thermo couple Reading Type 1 | Thermo couple Reading Type 2 |
|---|---|---|
| 1 min | 122 | 82 |
| 2 min | 170 | 165 |
| 3 min | 218 | 201 |
| 4 min | 255 | 240 |
| 5 min | 285 | 289 |
| 6 min | 312 | 320 |
| 7 min | 340 | 335 |
| 8 min | 354 | 342 |
| 9 min | 370 | 350 |
| 10 min | 382 | 355 |
| 11 min | 392 | 359 |
| 12 min | 399 | 361 |
| 13 min | 410 | 362 |
| 14 min | 414 | 363 |
| 15 min | 419 | 365 |
| 16 min | 420 | 366 |
| 17 min | 422 | 367 |
| 18 min | 425 | 368 |
| 19 min | 426 | 369 |
| 20 min | 429 | 370 |

As illustrated above, Type 1 and Type 2 maintained a temperature on an opposing side of the exposed portion of the samples within approximately 430° C. or less after 20 minutes of exposure. Advantageously, even with a material structure having a thickness of 4 mm, the present teachings may provide an insulative material that may perform similar or better when compared to conventional materials.

Figure 6:
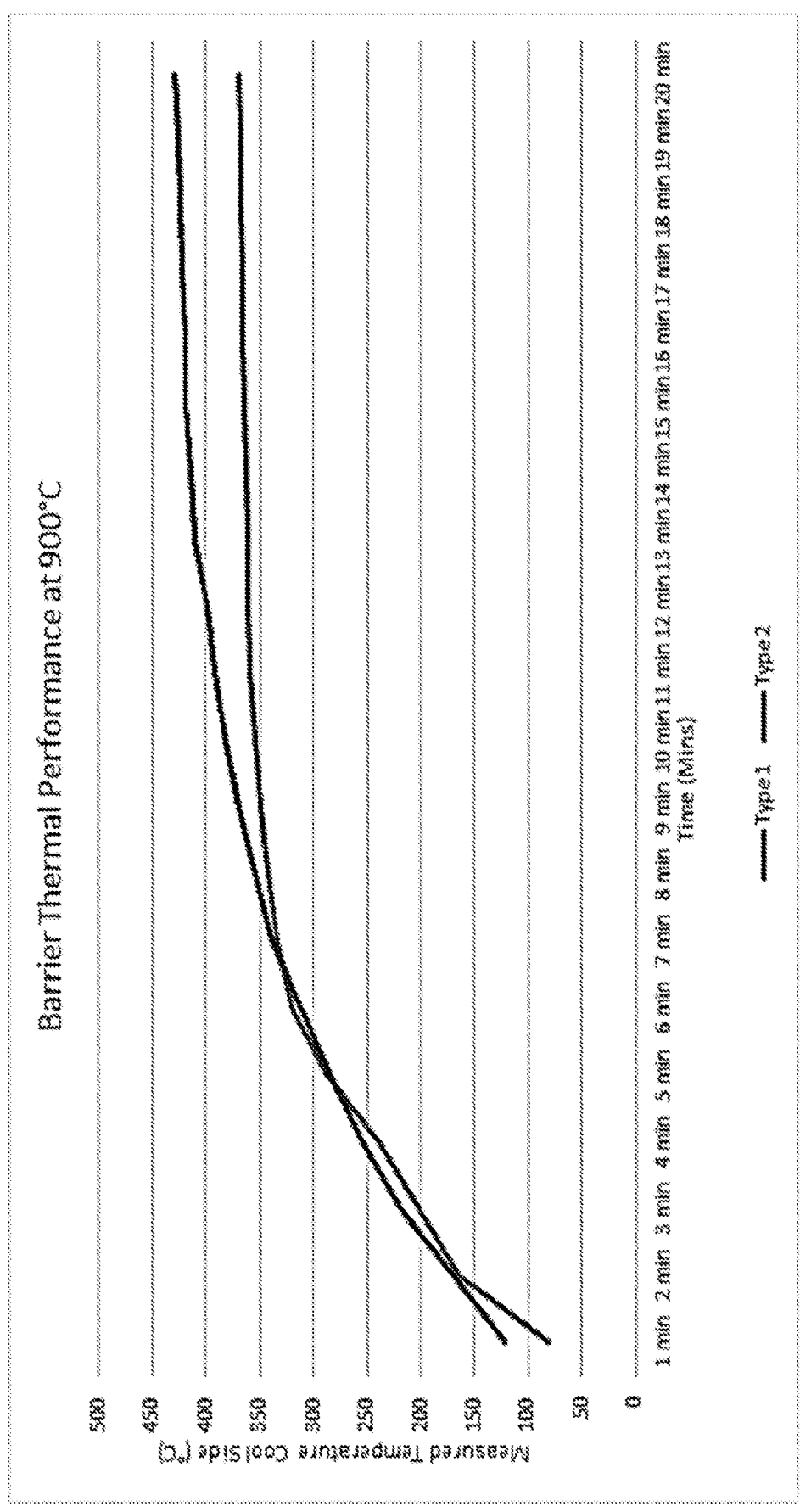
FIG. 6 is a graph illustrating an exemplary multi-layered insulator material construction's barrier thermal performance during exposure to a heightened temperature.

Similarly, FIG. 6 illustrates the performance of insulator material based upon the insulator material constructions of Type 1 and Type 2 identified above upon exposure to heat. As shown, upon exposure to a heightened temperature of 900° C., the insulator material may beneficially limit a temperature on an opposing side of the insulator material relative to the exposed side over a duration of 20, thereby protecting an outside area adjacent to a battery system. That is, FIG. 6 illustrates the values shown in Table 3 above. Beneficially, the present teachings provide an insulator material construction having a 4 mm thickness that may be exposed to 900° C. yet maintain a temperature of less than half the exposed temperature. That is, Type 1 and Type 2 material constructions may beneficially maintain a temperature of less than 500° C. on an opposing surface to that of the exposed surface.

As shown in Table 4 below, Samples A-C of a multi-layered insulator material configuration in accordance with the present teachings were tested to determine a normal incidence sound absorption coefficient (SAC). As shown below, the SAC was measured at various frequencies ranging from 100 Hz to 4,500 Hz. It should be noted that Samples A-C each included a multi-layered structure having one or more layers disposed between opposing nonwoven layers.

TABLE 4

Normal Incidence Sound
Absorption Coefficient
Samples

| Frequency (Hz) | A | B Alpha | C |
|---|---|---|---|
| 100 | 0.09 | 0.07 | 0.09 |
| 120 | 0.08 | 0.05 | 0.08 |
| 160 | 0.09 | 0.06 | 0.07 |
| 200 | 0.08 | 0.07 | 0.08 |
| 250 | 0.08 | 0.07 | 0.08 |
| 310 | 0.10 | 0.10 | 0.10 |
| 400 | 0.12 | 0.13 | 0.13 |
| 500 | 0.16 | 0.18 | 0.18 |
| 630 | 0.20 | 0.23 | 0.23 |
| 800 | 0.28 | 0.31 | 0.30 |
| 1000 | 0.37 | 0.39 | 0.38 |
| 1250 | 0.48 | 0.46 | 0.45 |
| 1600 | 0.60 | 0.58 | 0.57 |
| 2000 | 0.74 | 0.68 | 0.67 |
| 2500 | 0.84 | 0.70 | 0.72 |
| 3150 | 0.85 | 0.72 | 0.75 |
| 4000 | 0.83 | 0.74 | 0.77 |
| 4500 | 0.81 | 0.76 | 0.78 |
| NRC-SAC | 0.34 | 0.33 | 0.33 |

Figure 8:
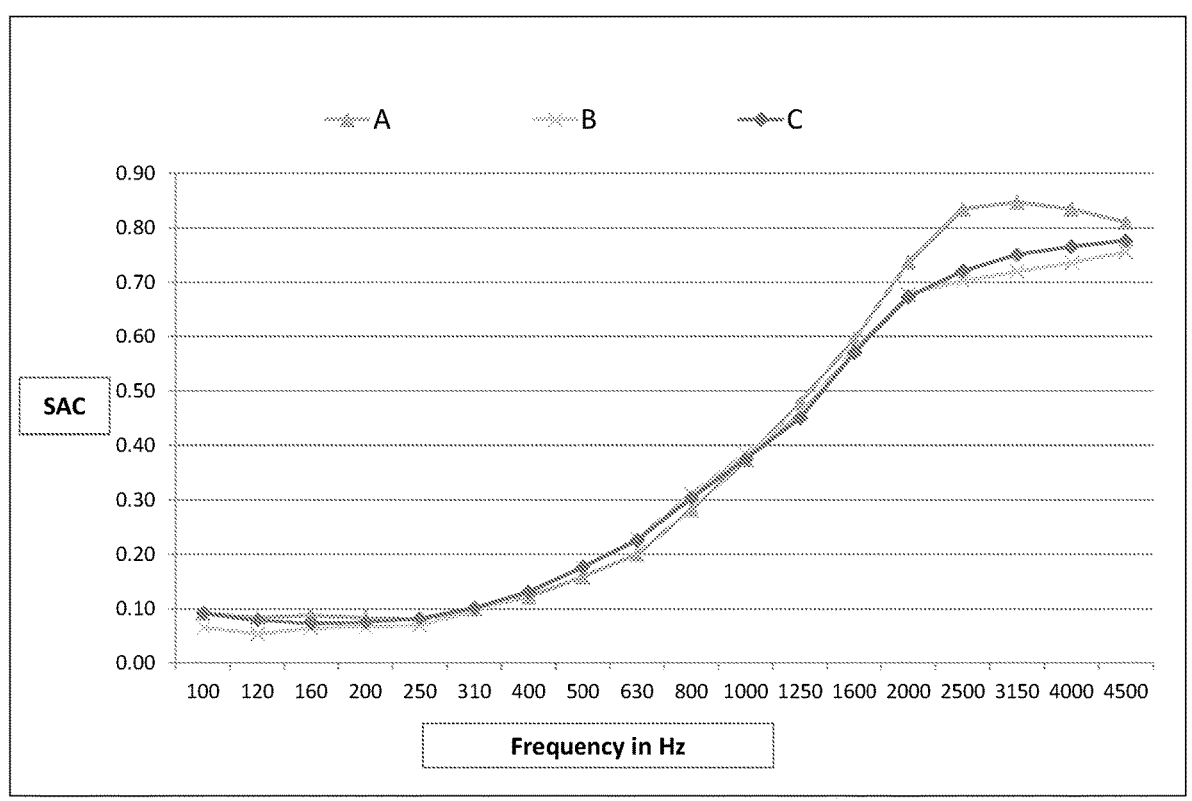
FIG. 8 is a graph illustrating exemplary multi-layered insulator material construction performances with respect to their Sound Absorption Coefficient.

As shown above, Samples A-C each had an SAC less than 1 even at elevated frequencies at or near 4,500 Hz. Furthermore, an SAC taken for each sample as an average of measurements taken at 250 Hz, 500 Hz, 1,000 Hz, and 2,000 Hz illustrate the each of the samples had an average of at or below 0.81. The above results are illustrated in FIG. 8 for Samples A-C.

As shown in Table 5 below, Samples A-E of a multi-layered insulator material configuration in accordance with the present teachings were tested to determine sound transmission loss. As shown below, the sound transmission loss was measured at various frequencies ranging from 100 Hz to 4,500 Hz. It should be noted that Samples A-E each included a multi-layered structure having various configurations in accordance with the present teachings.

TABLE 5

Normal Incidence Sound Transmission Loss
Samples

| Frequency (Hz) | A | B | C | D | E |
|---|---|---|---|---|---|
| 100 | 11.43 | 10.27 | 12.26 | 10.67 | 10.01 |
| 120 | 11.58 | 10.28 | 12.22 | 10.65 | 10.00 |
| 160 | 11.69 | 10.29 | 12.27 | 10.76 | 10.04 |
| 200 | 11.57 | 10.19 | 12.14 | 10.61 | 9.93 |
| 250 | 11.63 | 10.22 | 12.18 | 10.64 | 9.98 |
| 310 | 11.60 | 10.18 | 12.16 | 10.61 | 9.95 |
| 400 | 11.52 | 10.13 | 12.07 | 10.53 | 9.89 |
| 500 | 11.60 | 10.19 | 12.12 | 10.61 | 9.95 |
| 630 | 11.60 | 10.19 | 12.10 | 10.64 | 9.93 |
| 800 | 11.58 | 10.25 | 12.07 | 10.74 | 9.80 |
| 1000 | 11.57 | 10.39 | 12.11 | 10.54 | 9.63 |
| 1250 | 11.36 | 10.41 | 11.93 | 10.34 | 9.62 |
| 1600 | 11.29 | 10.27 | 11.84 | 10.47 | 9.84 |
| 2000 | 11.64 | 10.31 | 12.15 | 10.78 | 10.29 |
| 2500 | 12.22 | 10.65 | 12.69 | 11.28 | 10.76 |
| 3150 | 12.96 | 11.19 | 13.40 | 11.93 | 11.37 |
| 4000 | 14.14 | 11.87 | 14.54 | 13.18 | 12.57 |

TABLE 5-continued

| | Normal Incidence Sound Transmission Loss Samples | | | | |
|---|---|---|---|---|---|
| Frequency (Hz) | A | B | C | D | E |
| 4500 | 15.21 | 12.64 | 15.37 | 13.75 | 13.31 |
| Average | 12.01 | 10.55 | 12.53 | 11.04 | 10.38 |

Figure 9:
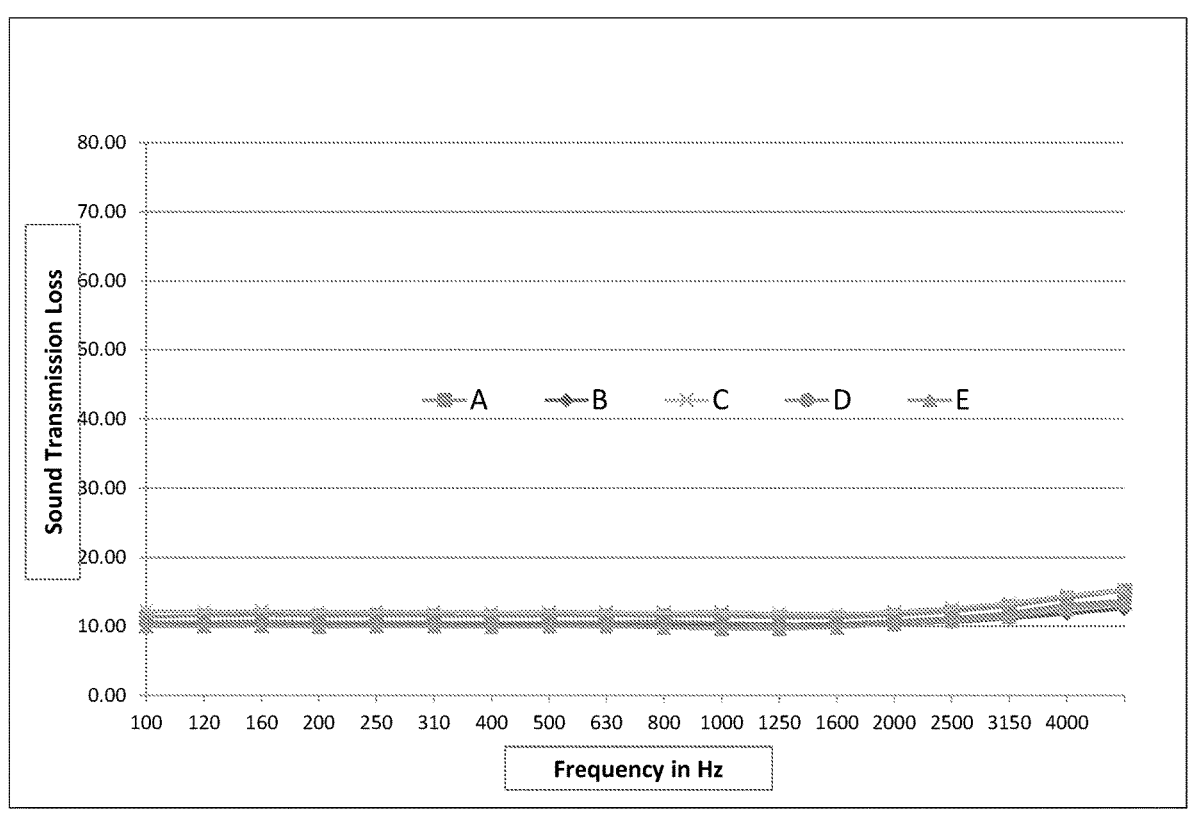
FIG. 9 is a graph illustrating exemplary multi-layered insulator material construction performances with respect to their Sound Transmission Loss.

As shown above, Samples A-E each had an average sound transmission loss of 12.53 or less. The above results are illustrated in FIG. 9 for Samples A-E.

As shown in Table 6 below, Samples A-E of a multi-layered insulator material configuration in accordance with the present teachings were tested to determine a normal incidence sound absorption coefficient (SAC). As shown below, the SAC was measured at various frequencies ranging from 100 Hz to 4,500 Hz. It should be noted that Samples A-E each included various multi-layered structures having one or more layers in accordance with the present teachings,

TABLE 6

| | Normal Incidence Sound Absorption Coefficient Samples | | | | |
|---|---|---|---|---|---|
| Frequency (Hz) | A | B | C Alpha | D | E |
| 100 | 0.08 | 0.07 | 0.07 | 0.07 | 0.09 |
| 120 | 0.07 | 0.04 | 0.05 | 0.05 | 0.06 |
| 160 | 0.07 | 0.04 | 0.05 | 0.04 | 0.05 |
| 200 | 0.08 | 0.06 | 0.06 | 0.04 | 0.04 |
| 250 | 0.08 | 0.04 | 0.05 | 0.04 | 0.05 |
| 310 | 0.10 | 0.05 | 0.06 | 0.04 | 0.07 |
| 400 | 0.13 | 0.07 | 0.08 | 0.06 | 0.09 |
| 500 | 0.17 | 0.10 | 0.11 | 0.08 | 0.12 |
| 630 | 0.22 | 0.13 | 0.15 | 0.10 | 0.16 |
| 800 | 0.30 | 0.19 | 0.22 | 0.15 | 0.23 |
| 1000 | 0.38 | 0.27 | 0.30 | 0.21 | 0.31 |
| 1250 | 0.46 | 0.36 | 0.40 | 0.28 | 0.38 |
| 1600 | 0.58 | 0.50 | 0.53 | 0.40 | 0.55 |
| 2000 | 0.70 | 0.67 | 0.68 | 0.57 | 0.67 |
| 2500 | 0.75 | 0.84 | 0.82 | 0.73 | 0.75 |
| 3150 | 0.77 | 0.94 | 0.87 | 0.87 | 0.80 |
| 4000 | 0.78 | 0.94 | 0.88 | 0.93 | 0.80 |
| 4500 | 0.78 | 0.91 | 0.87 | 0.92 | 0.80 |
| NRC-SAC | 0.33 | 0.27 | 0.29 | 0.22 | 0.29 |

Figure 10:
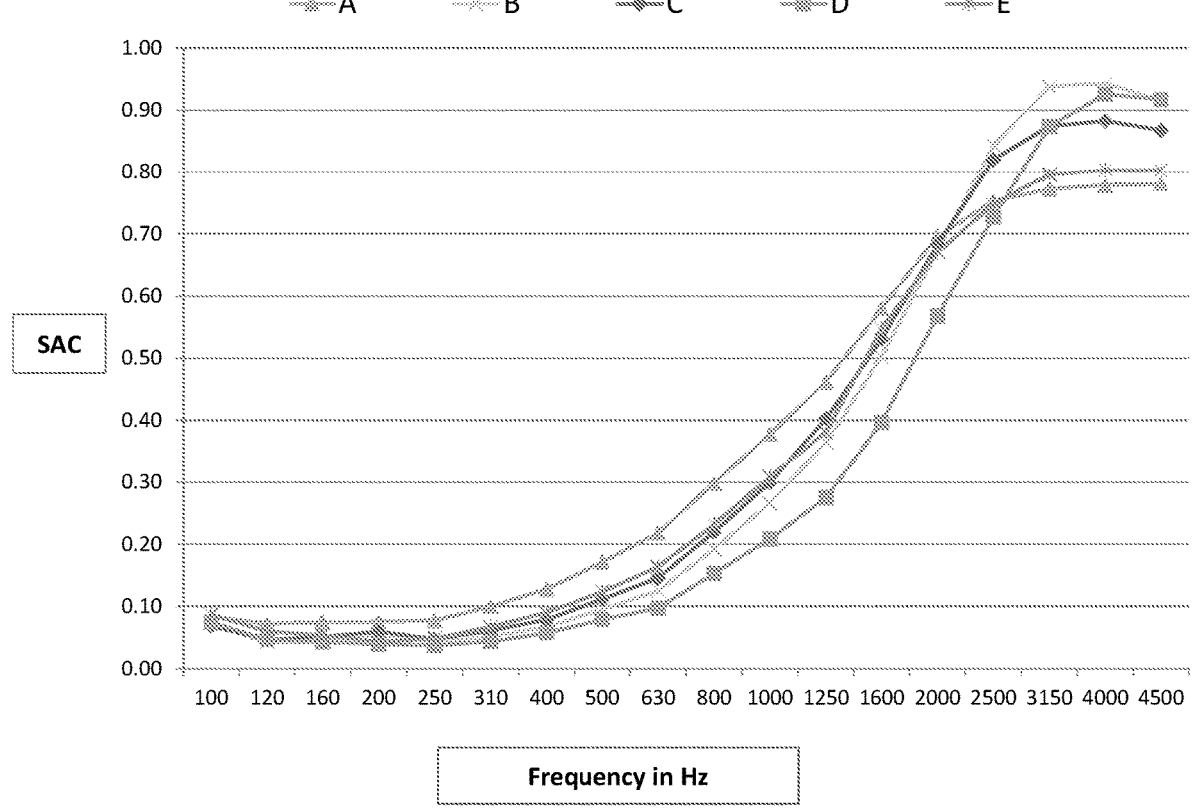
FIG. 10 is a graph illustrating exemplary multi-layered insulator material construction performances with respect to their Sound Transmission Loss.

As shown above, Samples A-E each had an SAC less than 1 even at elevated frequencies at or near 4,500 Hz. Furthermore, an SAC taken for each sample as an average of measurements taken at 250 Hz, 500 Hz, 1,000 Hz, and 2,000 Hz illustrate that each of the samples had an average of at or below 0.33. The above results are illustrated in FIG. 10 for Samples A-E. It should also be noted that Samples A-E in Table 6 correspond to Samples A-E in Table 5 above.

Figure 11:
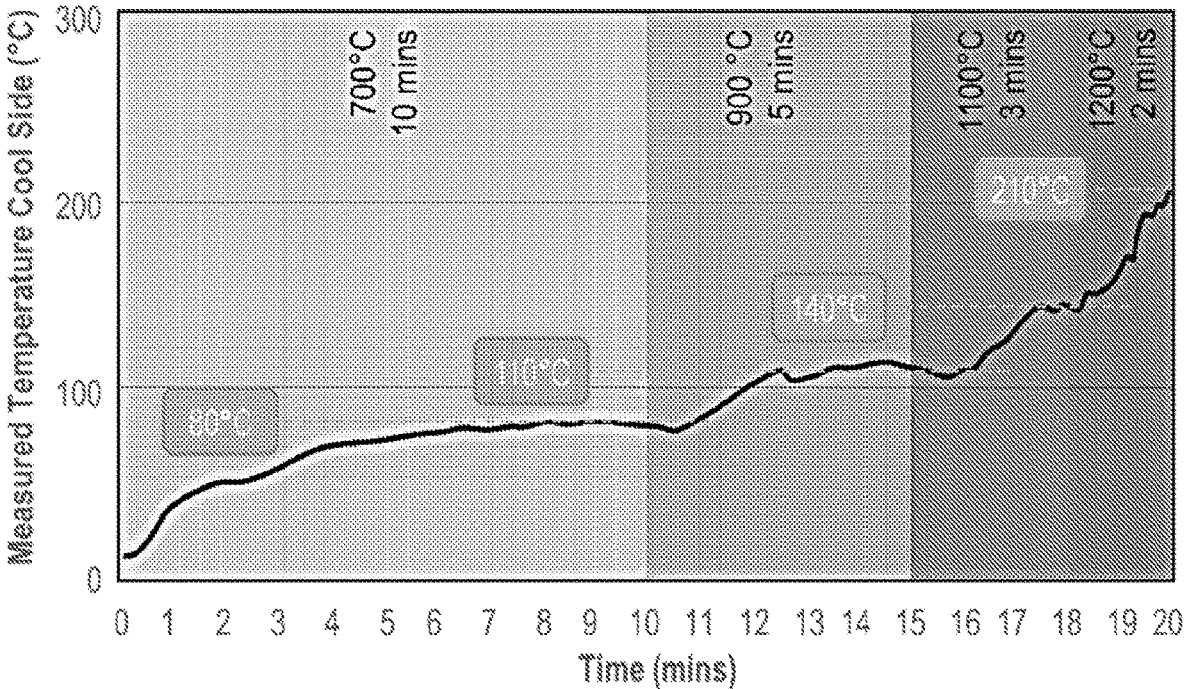
FIG. 11 is a graph illustrating insulative performance of an insulator material having a vertical and horizontal stitch pattern.

As shown in FIG. 11, an insulative material having a vertical and horizontal stitch pattern (see FIG. 7C) was exposed to gradually increasing temperatures on an exposed ("hot") side of the material, ranging from about 700° C. to about 1200° C. over approximately 20 minutes. Testing was completed upon exposure to a flame created by a gas burned.

As shown, the insulative material was able to maintain a temperature on an opposing unexposed ("cool") side of the insulative material less 200° C. upon exposure for the duration of 20 minutes. It should also be noted that no insulative material sample decomposition and/or dust was observed during such testing.

Additionally, it is envisioned that one or more of the insulative material layers may be coated for further improve thermal insulation. For example, one or more ceramic coatings (e.g., Superwool®) may coat one or more of the layers, the fibers of one or more layers, or a combination thereof. Similarly, or additionally, the one or more layers, fibers of one or more layers, or a combination thereof may also be coated by additional coating or secondary materials. Such coatings may include, but are not limited to, calcium carbonate (CaCO3) or variants thereof, other coatings, or a combination thereof. For example, one or more of the layers may include one or multiple of the aforementioned coatings. The layers may be locally coated of the overall insulative material may be coated (e.g., along an outer surface of the insulative material once formed).

The coatings may be applied in any desired manner. The coatings may be applied as a paste, a substrate, a film, a liquid, a powder, or a combination thereof. The coatings may be applied in any desired thickness, weight, or both. For example, the coatings may be applied at about 100 grams per square meter (GSM) or more, about 200 GSM or more, or about 300 GSM or more. The coatings may be applied at about 600 GSM or less, about 500 GSM or less, or about 400 GSM or less.

Exemplary layers with a CaCO3 coating are illustrated in Table 7 below:

TABLE 7

| Sample No. | Mean Temp (Deg C.) | Delta Temp (Dec C.) | Thermal Conductivtiy W/m-k | Thermal Resistance M2*k/w |
|---|---|---|---|---|
| 1 | 22.5 | 10 | 0.026890 | 0.29751 |
| 2 | 22.5 | 10 | 0.026362 | 0.303462 |

As shown above, the CaCO3 coating was applied to two samples, each of which was an exemplary layer of an insulative material as described herein. Sample 1 had a thickness of about 5 mm and Sample 2 had a thickness of about 6 mm. Beneficially, the CaCO3 coating improved overall performance with respect to thermal conductivity and thermal resistance when compared to a layer of the insulative material free of a coating. However, it should be noted that the teachings herein are not limited to having a coating or being free of a coating. That is, the insulative material may be tuned based on a given application to apply a coating as needed.

Table 8 below illustrates exemplary layers of an insulative material as described herein. Samples 1-5 illustrates five exemplary layers free of any coating. Samples 6-10 illustrates samples 1-5 with a CaCO3 coating, while samples 11-15 illustrates sample layers 6-10 with the addition of a ceramic (e.g., Superwool®) coating. As can be seen in Table 8, the addition of CaCO3, a ceramic coating, or both may improve the delta T performance for the exemplary insulative material layers.

TABLE 8

| Time in Min | 1 Layer 1 | 2 Layer 2 | 3 Layer 3 | 4 Layer 4 | 5 Layer 5 |
|---|---|---|---|---|---|
| 1 | 136 | 79 | 123 | 70 | 150 |
| 2 | 207 | 118 | 176 | 99 | 227 |
| 3 | 259 | 150 | 219 | 130 | 278 |
| 4 | 297 | 177 | 250 | 156 | 314 |
| 5 | 324 | 200 | 275 | 177 | 339 |
| 6 | 345 | 219 | 293 | 194 | 358 |

23

TABLE 8-continued

| | | | | | |
|---|---|---|---|---|---|
| 7 | 360 | 234 | 307 | 207 | 372 |
| 8 | 372 | 247 | 318 | 219 | 382 |
| 9 | 382 | 256 | 328 | 229 | 388 |
| 10 | 389 | 265 | 335 | 238 | 393 |
| 11 | 394 | 273 | 340 | 244 | 396 |
| 12 | 398 | 278 | 346 | 250 | 399 |
| 13 | 401 | 283 | 349 | 256 | 400 |
| 14 | 403 | 286 | 351 | 261 | 403 |
| 15 | 405 | 290 | 354 | 266 | 404 |
| Delta T % | 55% | 68% | 61% | 70% | 55% |

| | 6 | 7 | 8 | 9 | 10 |
|---|---|---|---|---|---|
| | Layer 1 | Layer 2 | Layer 3 | Layer 4 | Layer 5 |
| | CaCO3 | CaCO3 | CaCO3 | CaCO3 | CaCO3 |
| Time in Min | Coated | Coated | Coated | Coated | Coated |
| 1 | 119 | 58 | 81 | 60 | 53 |
| 2 | 178 | 79 | 126 | 100 | 56 |
| 3 | 222 | 90 | 159 | 131 | 104 |
| 4 | 254 | 104 | 186 | 157 | 132 |
| 5 | 280 | 118 | 209 | 177 | 156 |
| 6 | 297 | 128 | 226 | 192 | 176 |
| 7 | 311 | 153 | 240 | 206 | 192 |
| 8 | 321 | 177 | 252 | 217 | 205 |
| 9 | 331 | 195 | 262 | 225 | 217 |
| 10 | 337 | 209 | 268 | 231 | 226 |
| 11 | 342 | 221 | 276 | 237 | 234 |
| 12 | 347 | 230 | 282 | 242 | 241 |
| 13 | 349 | 237 | 286 | 247 | 246 |
| 14 | 352 | 244 | 291 | 251 | 252 |
| 15 | 353 | 250 | 295 | 253 | 257 |
| Delta T % | 61% | 72% | 67% | 72% | 71% |

| | 11 | 12 | 13 | 14 | 15 |
|---|---|---|---|---|---|
| | Layer 1 | Layer 2 | Layer 3 | Layer 4 | Layer 5 |
| | Ceramic | Ceramic | Ceramic | Ceramic | Ceramic |
| Time in Min | Coating | Coating | Coating | Coating | Coating |
| 1 | 112 | 71 | 74 | 46 | 57 |
| 2 | 168 | 101 | 113 | 72 | 81 |
| 3 | 209 | 126 | 145 | 99 | 111 |
| 4 | 240 | 148 | 175 | 12 | 138 |
| 5 | 264 | 167 | 194 | 142 | 161 |
| 6 | 280 | 183 | 214 | 158 | 180 |
| 7 | 293 | 196 | 229 | 172 | 196 |
| 8 | 303 | 208 | 242 | 183 | 208 |
| 9 | 312 | 218 | 251 | 192 | 220 |
| 10 | 318 | 226 | 259 | 200 | 229 |
| 11 | 323 | 234 | 266 | 207 | 237 |
| 12 | 327 | 240 | 271 | 213 | 242 |
| 13 | 329 | 245 | 274 | 221 | 249 |
| 14 | 332 | 250 | 277 | 230 | 253 |
| 15 | 333 | 254 | 281 | 235 | 255 |
| Delta T % | 63% | 72% | 69% | 74% | 72% |

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference here in their entirety for all purposes. Other combinations are also possible as will be gleaned from the following claims, which are also hereby incorporated herein in their entirety by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

ELEMENT LIST

10 Battery Box Assembly
11 Battery Cover
11A Upper Cover
11B Lower Cover
12 Battery
13 Battery Box Componentry
14 Insulator Material
16 Top Layer
18 Second Layer
20 Third Layer
22 Fourth Layer
24 Fifth Layer
26 Sixth Layer
28 Stitching
30 Exposure Region
32 Pocket
40 Vehicle

What is claimed is:

1. An article comprising:
a plurality of layers, the layers comprising:

one or more nonwoven layers, wherein at least one nonwoven layer comprises polyacrylonitrile fibers, oxidized polyacrylonitrile fibers, inorganic fibers, or a combination thereof;

one or more E-glass layers;

one or more E-CR glass layers;

wherein each of the one or more nonwoven layers has a temperature resistance of about 200° C. or greater;

wherein at least one of the one or more nonwoven layers is coated with a ceramic coating;

wherein the article is adapted to provide thermal insulation for a battery and avoid and/or confine fire propagation during a battery thermal runaway event; and wherein the article provides a time period of at least 5 minutes between a detection of the battery thermal runaway event and an actual impact of the battery thermal runaway event within a passenger compartment of a vehicle.

2. The article of claim 1, wherein the article includes a metallic facing layer.

3. The article of claim 1, wherein at least one of the one or more nonwoven layers comprises the inorganic fibers, and wherein the inorganic fibers comprise silica fibers.

4. The article of claim 1, wherein the article has a thickness of about 15 mm or less.

5. The article of claim 1, wherein at least one of the one or more nonwoven layers has a temperature resistance of about 1000° C. or greater.

6. The article of claim 1, wherein at least one of the layers is treated with an intumescent solution.

7. The article of claim 3, wherein the inorganic fibers are present in the at least one of the one or more nonwoven layers comprising inorganic fibers in an amount of about 50 wt % or greater.

8. The article of claim 1, wherein the article comprises six or fewer layers.

9. The article of claim 1, wherein the layers include the one or more E-glass layers and the one or more E-CR glass layers and any of the following in any combination: a metallized layer, a layer formed of oxidized polyacrylonitrile fibers, a needlepunched layer, a cross-lapped layer, a thermo-bonded layer, a layer formed of inorganic fibers, a high silica nonwoven layer, a ceramic blanket, a black glass cloth layer, a vertically lapped layer.

10. The article of claim 1, wherein the article comprises:

(a) one or more stainless-steel metallic foil facing layers;

(b) one or more nonwoven layers including oxidized polyacrylonitrile fibers;

(c) one or more high silica layers;

(d) one or more wool-based paper and/or blanket layers; and (e) one or more additional nonwoven layers free of oxidized polyacrylonitrile fibers.

11. The article of claim 1, wherein at least one of the one or more nonwoven layers are needle-punched, cross-lapped, or both.

12. The article of claim 1, wherein the article includes one or more black glass cloth layers or high silica layers.

13. The article of claim 1, wherein the article is used in conjunction with an active temperature control system within the vehicle to maintain a battery temperature within about 50° C.

14. The article of claim 1, wherein the article is a passive insulation product that is adapted for heat management between modules or cells within a battery or battery system.

15. The article of claim 1, wherein the minimum time period is about 20 minutes or less between the detection of the battery thermal runaway event and the actual impact of the battery thermal runaway event within the passenger compartment of the vehicle.

16. The article of claim 1, wherein the article is adapted to maintain a temperature of about 200° C. or less on a surface layer of the article that opposes a facing layer for at least 5 minutes when the facing layer is exposed to a temperature of about 500° C. to about 1200° C.

17. The article of claim 1, wherein the article includes stitching extending through the one or more nonwoven layers, and wherein the stitching creates one or more depressions between one or more pockets formed in the article.

18. The article of claim 1, wherein at least one of the one or more nonwoven layers is coated with a $CaCO_3$ coating.

19. The article of claim 17, wherein the stitching creates a stitching pattern including a hatched pattern, a zig-zag pattern, a unidirectional pattern, a bidirectional pattern, or a randomized pattern.

20. The article of claim 17, wherein the stitching includes a perimeter stitch, vertical stitch, horizontal stitch, or a combination thereof.

* * * * *